United States Patent
Sato

(10) Patent No.: US 10,417,796 B2
(45) Date of Patent: Sep. 17, 2019

(54) IMAGE FORMING DEVICE EXECUTING DRAWING PROCESS AND RECORDING MEDIUM

(71) Applicant: KYOCERA Document Solutions Inc., Osaka (JP)

(72) Inventor: Yasuhide Sato, Osaka (JP)

(73) Assignee: KYOCERA Document Solutions, Inc., Osaka (JP)

( * ) Notice: Subject to any disclaimer, the term of this patent is extended or adjusted under 35 U.S.C. 154(b) by 0 days.

(21) Appl. No.: 15/821,151

(22) Filed: Nov. 22, 2017

(65) Prior Publication Data
US 2018/0144517 A1 May 24, 2018

(30) Foreign Application Priority Data

Nov. 22, 2016 (JP) .................................. 2016-226935
Nov. 22, 2016 (JP) .................................. 2016-226936

(51) Int. Cl.
*G06T 11/20* (2006.01)
*G06F 9/38* (2018.01)
*G06T 7/10* (2017.01)

(52) U.S. Cl.
CPC .............. *G06T 11/203* (2013.01); *G06F 9/38* (2013.01); *G06T 7/10* (2017.01); *G06T 2215/08* (2013.01)

(58) Field of Classification Search
CPC ...................................................... G06F 9/38
See application file for complete search history.

(56) References Cited

U.S. PATENT DOCUMENTS 6,587,110 B1 * 7/2003 Kunimatsu ............. G06T 17/00
345/419
7,088,468 B1 * 8/2006 Thuren ................... G03F 7/704
257/E21.575
(Continued)

FOREIGN PATENT DOCUMENTS

JP  H11-291566 A  10/1999
JP  2000-268186 A   9/2000
(Continued)

OTHER PUBLICATIONS

Japan Patent Office. Office Action of foreign counterpart, dated Jun. 12, 2019, Application No. 2016-226935.
(Continued)

*Primary Examiner* — Grace Q Li
(74) *Attorney, Agent, or Firm* — Hawaii Patent Services; Nathaniel K. Fedde; Kenton N. Fedde

(57) ABSTRACT

Provided is an image forming device and a recording medium which can execute plural drawing processes in parallel without having to use different data lists for drawing processes. The image process device can include simultaneously plural drawing process sections each of which executes its rendering for lines one by one based on a display list. The image forming device causes the plural drawing process sections, each of which renders for a specific region that includes plural lines within a page, to render for different lines every specific number of lines, the specific number being determined by subtracting 1 from all the numbers of the plural drawing process sections that render their renderings for the specific regions.

7 Claims, 29 Drawing Sheets

(56) References Cited

U.S. PATENT DOCUMENTS

| | | | | |
|---|---|---|---|---|
| 2006/0077210 A1* | 4/2006 | Morris | ............... | G06T 11/001 |
| | | | | 345/613 |
| 2008/0042923 A1* | 2/2008 | De Laet | ............... | G05B 15/02 |
| | | | | 345/1.3 |
| 2016/0314019 A1* | 10/2016 | Naito | ............... | G06F 9/5066 |
| 2018/0124174 A1* | 5/2018 | Swallow | ............. | H04L 67/1097 |

FOREIGN PATENT DOCUMENTS

| | | |
|---|---|---|
| JP | 2002-019200 A | 1/2002 |
| JP | 2007-130913 A | 5/2007 |

OTHER PUBLICATIONS

Japan Patent Office. Office Action of foreign counterpart, dated Jun. 12, 2019, Application No. 2016-226936.

\* cited by examiner

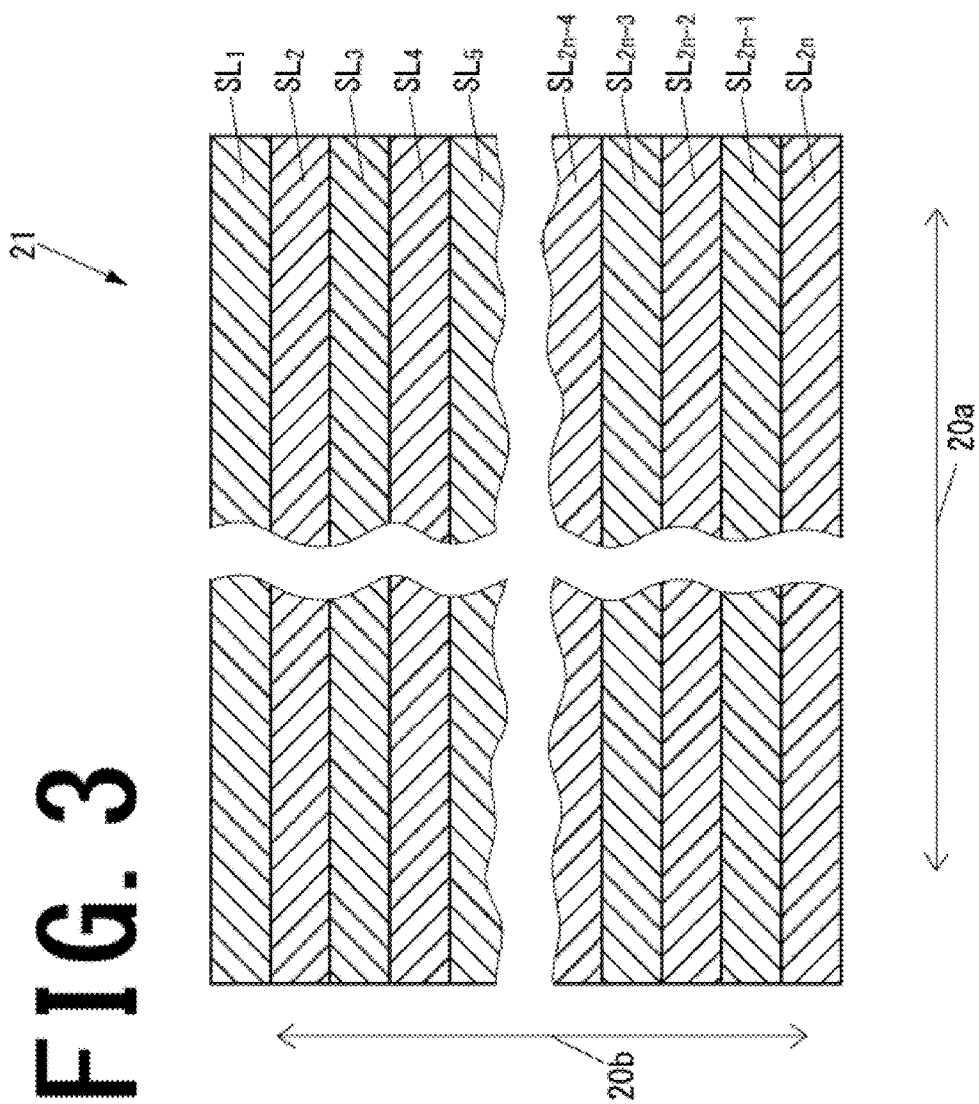

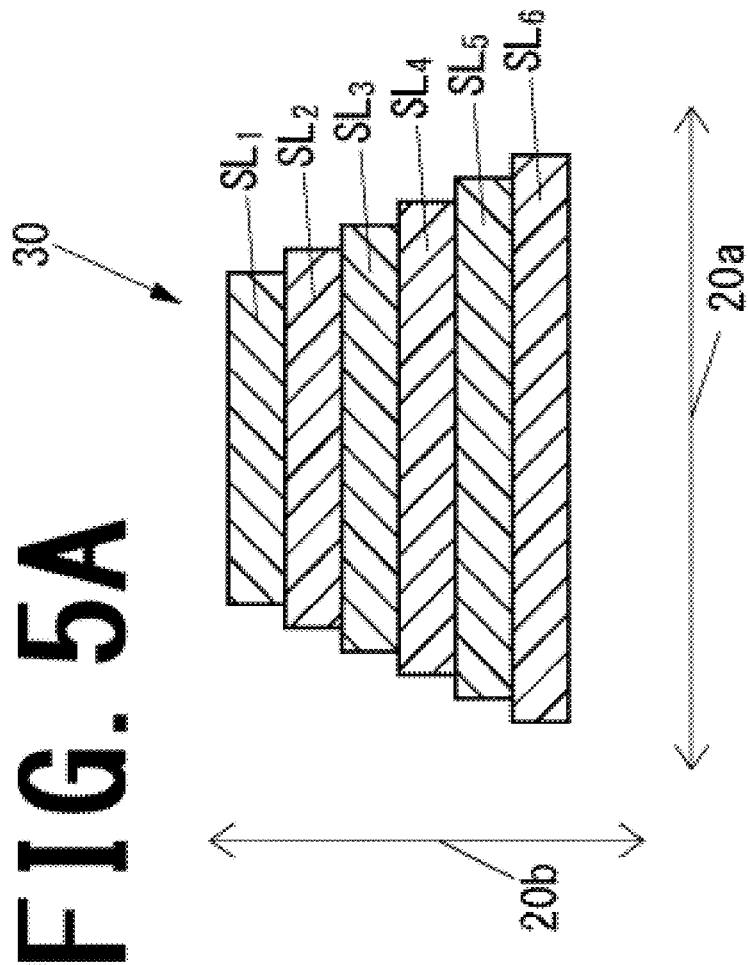

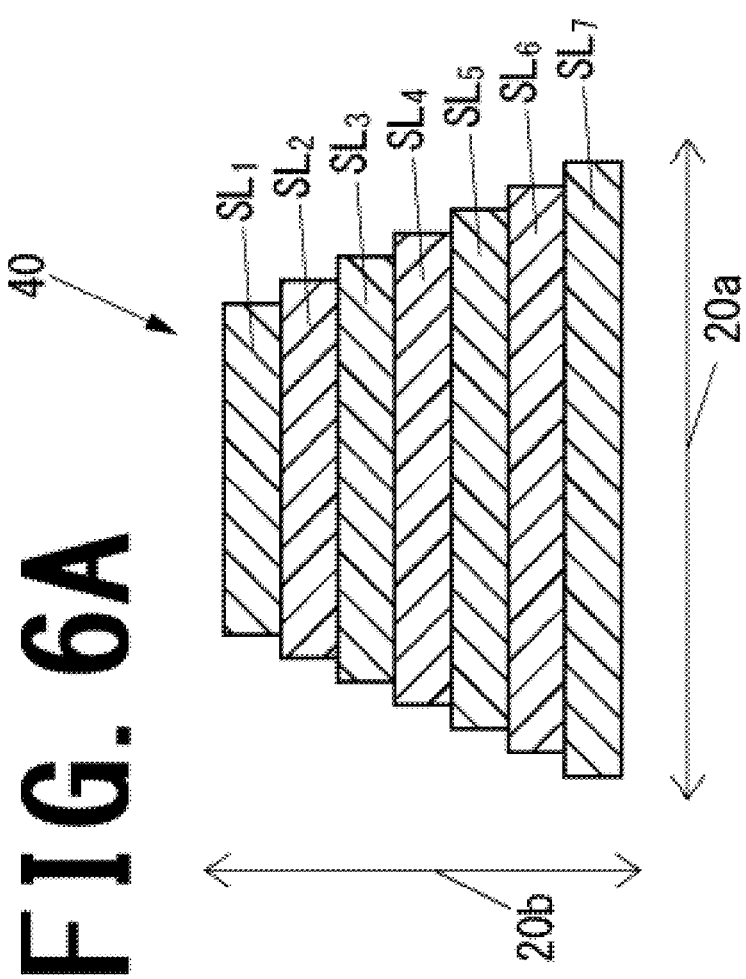

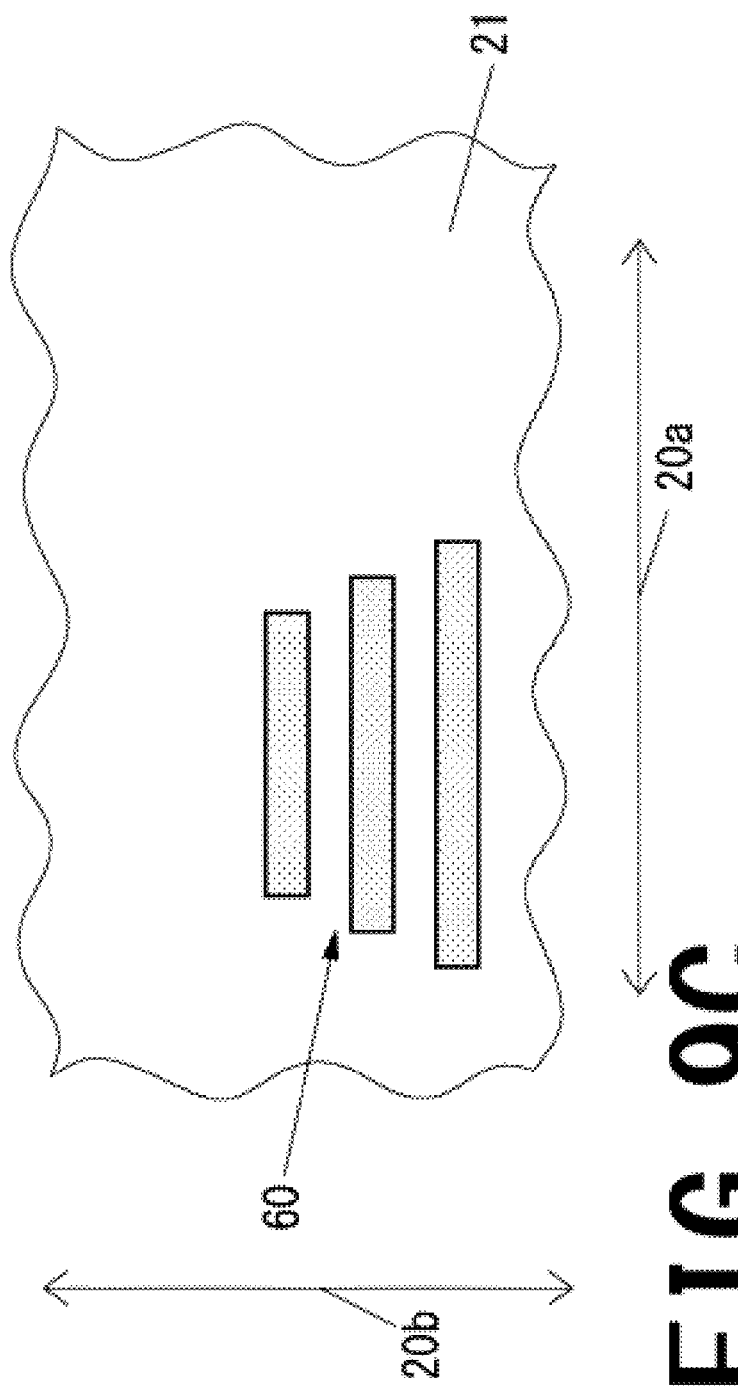

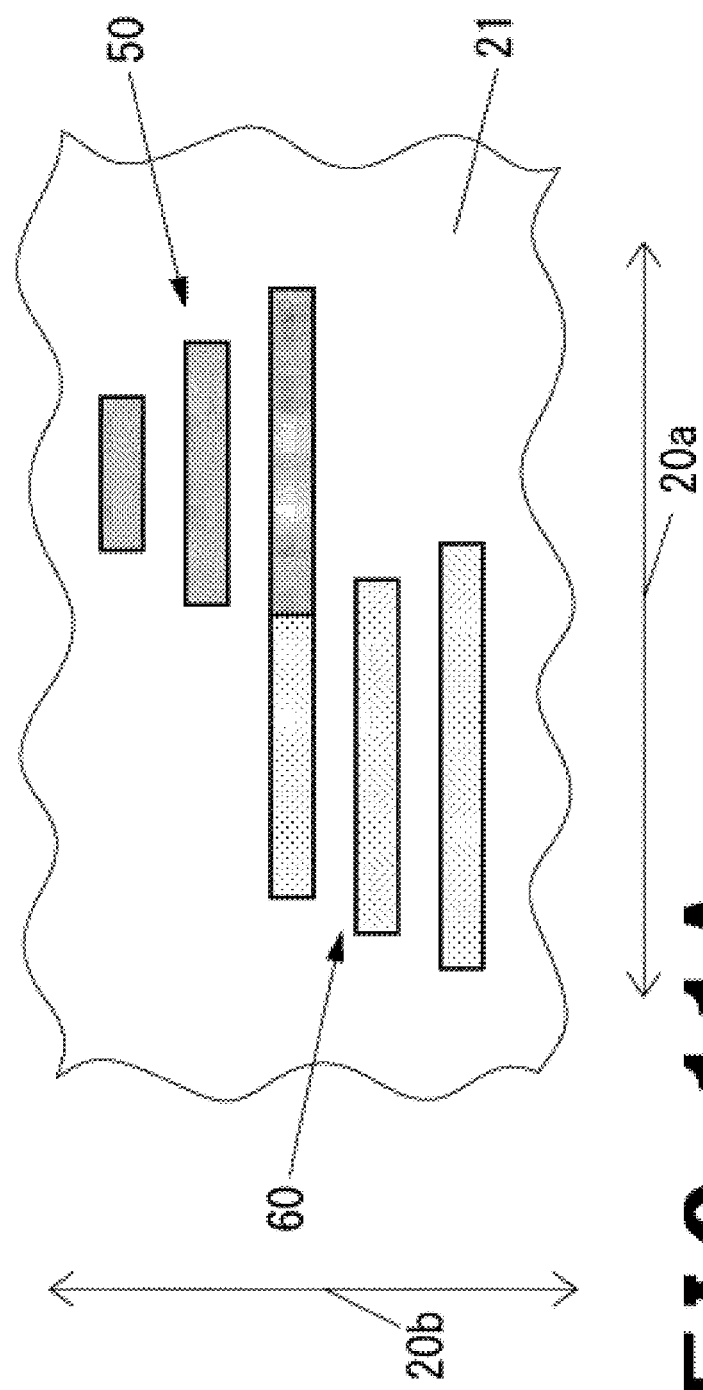

IMAGE FORMING DEVICE EXECUTING DRAWING PROCESS AND RECORDING MEDIUM

INCORPORATION BY REFERENCE

This application is based on and claims the benefit of priority from Japanese Patent Application No. 2016-226935 filed on Nov. 22, 2016 and Japanese Patent Application No. 2016-226936 filed on Nov. 22, 2016, the contents of which are hereby incorporated by reference.

BACKGROUND

The present disclosure relates to an image forming device that executes a drawing process.

An example of known typical drawing process device, as multiple drawing process means that renders for lines one by one, includes simultaneously drawing process means that renders for a region from the top to the bottom within a page including a plurality of lines based on a top-down display list and drawing process means that renders for this region from the bottom to the top based on a bottom-up display list.

SUMMARY

An image forming device of the present disclosure includes a processor that executes an image forming program and a memory that stores the image forming program. The processor, pursuant to instructions of the image forming program, can include simultaneously plural drawing process sections that render for lines one by one based on a display list, and operates to cause the plural drawing process sections, each of which renders for a specific region that includes plural lines within a page, to render for different lines every specific number of lines, the specific number being determined by subtracting 1 from the number of all the plural drawing process sections that execute their renderings for the specific regions.

The recording medium of the present disclosure is a non-transitory computer-readable recording medium that stores an image forming program executable by a computer. The image forming program causes the computer, based on a display list, to realize simultaneously plural drawing process sections each of which executes its rendering for lines one by one. The plural drawing process sections, each of which execute its rendering for a specific region that includes plural lines within a page, renders for different lines every specific number of lines, the specific number being determined by subtracting 1 from the number of all the plural drawing process sections that execute their renderings for the specific regions.

BRIEF DESCRIPTION OF THE DRAWINGS

FIG. 3 shows an example of a scan line of the band shown in FIG. 2;

FIG. 5A shows a trapezoidal object, as an example of an object included in the band shown in FIG. 2, which is made up of six scan lines.

FIG. 6A shows a trapezoidal object, an example of an object included in the band shown in FIG. 2, which is made up of seven scan lines;

FIG. 9C shows a portion rendered by the render thread B among two objects shown in FIG. 7C when rendering is executed based on scan lines counted with reference to each of the objects included in the band;

FIG. 11A shows a portion rendered by the render thread A among two objects shown in FIG. 7A when rendering is executed based on scan lines counted with reference to a band;

DETAILED DESCRIPTION

Hereinafter, embodiments of the present disclosure will be described with reference to the attached drawings.

First of all, a description will be made as to a configuration of an MFP as an image forming device according to an embodiment of the present disclosure.

Figure 1:
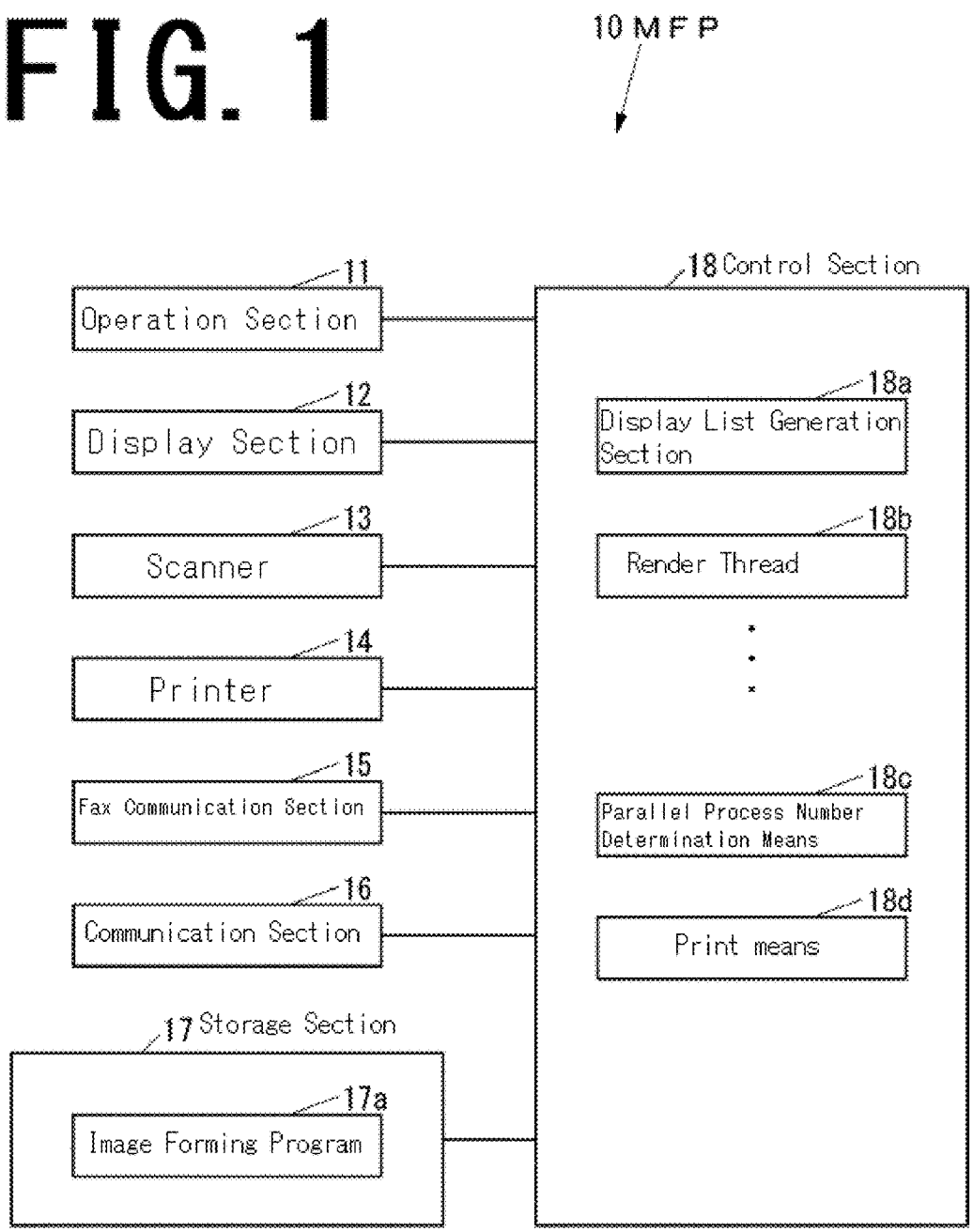
FIG. 1 shows a configuration of an MFP according to an embodiment of the present disclosure.

FIG. 1 shows a configuration of an MFP 10 according to the present embodiment

As shown in FIG. 1, the MFP 10 includes an operation section 11, a display section 12, a scanner 13, a printer 14, a fax communication section 15, a communication section 16, a storage section 17, and a control section 18. The operation section 11 is an input device such as a button arrangement to which various operations are input. The display section 12 is a display device such as an LCD for displaying various kinds of information. The scanner 13 is a reading device that reads an image from a document. The printer 14 is a printing device that executes printing on a recording medium such as paper. The fax communication section 15 is a facsimile device that performs facsimile communication via a communication line such as a public telephone line with an external facsimile device. The communication section 16 is a communication device that communicates with an external device via a network such as LAN Internet or in a direct manner of wired or wireless connection with bypassing the Internet. The storage section 17 is a nonvolatile storage device such as a semiconductor memory or an HDD that stores various types of information. The control section 18 is for an overall control of MFP 10.

The storage section 17 stores an image forming program 17a for forming an image. The image forming program 17a may be installed in the MFP 10 at the manufacturing stage of thereof, may be additionally installed in the MFP 10 from an external storage medium such as an SD card or a USB memory, or may be installed additionally to the MFP 10 from the network It may be installed.

The control section 18 includes, for example, a CPU, a ROM that stores programs and various data, and a RAM that is used as a work region of the CPU. The CPU executes a program stored in the ROM or the storage section 17. The CPU may have a plurality of cores such as four cores.

The control section 18 executes the image forming program 17a stored in the storage section 17 to thereby realizing a display list generating means 18a that generates a display list from the page description language.

The control section 18 executes the image forming program 17a stored in the storage section 17 to thereby realizing a render thread 18b as rendering process means for executing its rendering for one line (scan line) at a time based on the display list. It is to be noted that the control section 18 can realize a plurality of render threads 18b at the same time. Further, when the control section 18 includes a CPU having a plurality of cores, the plurality of the render threads 18b may be allocated (for example, evenly distributed) to at least two or more (for example, all) cores. In this case, for example, each core may have one or more render threads at the same time.

The control section 18 executes the image forming program 17a stored in the storage section 17 to thereby realizing a parallel process number determining means 18c that determines of the number of simultaneously equipped render threads 18b depending on the situation of the MFP 10.

The control section 18 executes the image forming program 17a stored in the storage section 17 to thereby realizing the printing section 18d that causes the printer 14 to execute printing based on the raster image data.

Hereinbelow, a description will be given of a case where four render threads including a render thread A, a render thread B, a render thread C and a render thread D are simultaneously provided as the render thread 18b.

Figure 2:
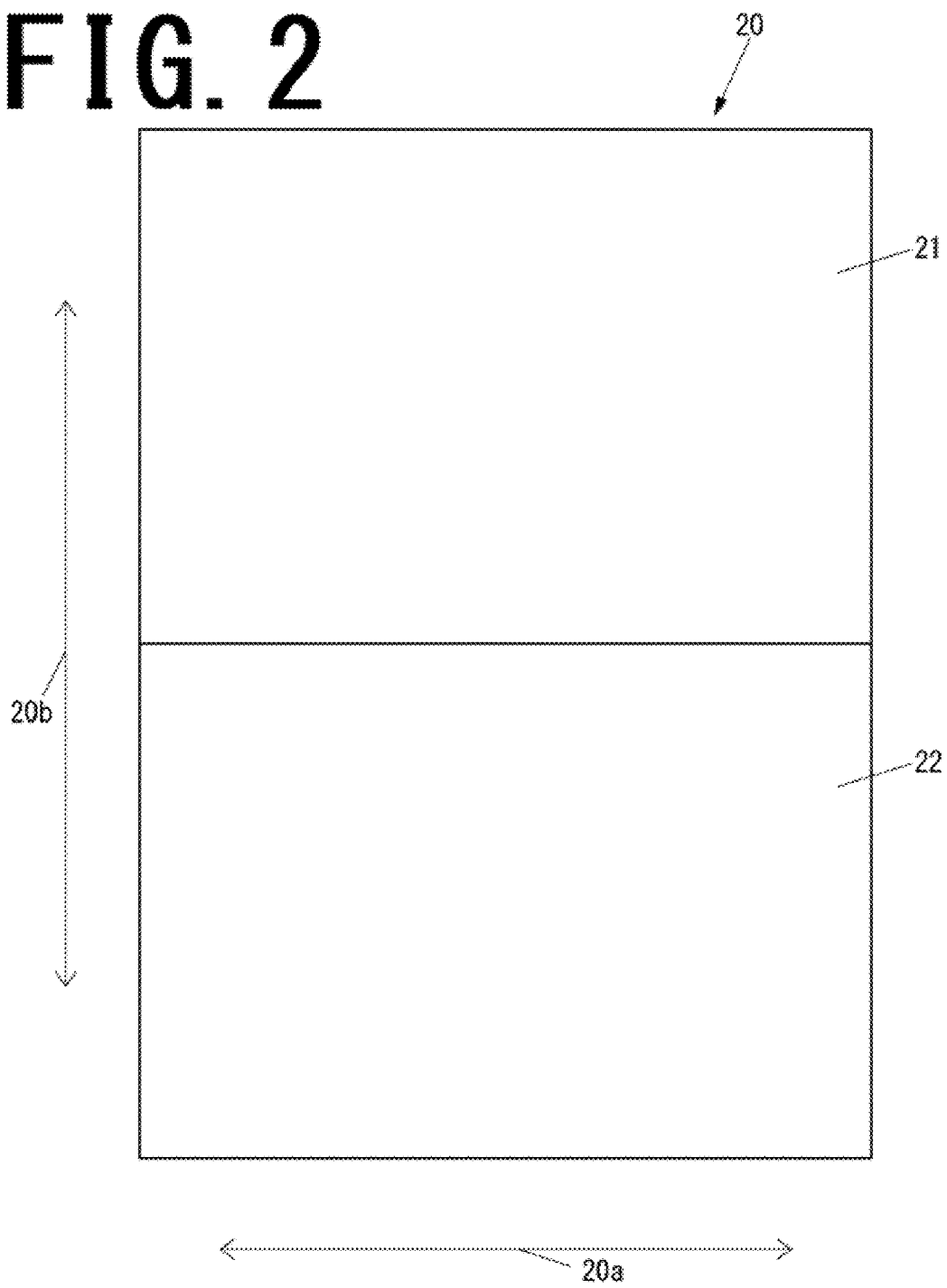
FIG. 2 shows an example of a page rendered by the render thread shown in FIG. 1.

FIG. 2 shows a page 20, as an example, that is rendered by the render thread 18b.

As shown in FIG. 2, the page 20 includes a large number of scan lines extending in a direction indicated by the arrow 20a, the scan lines being arranged in a direction indicated by an arrow 20b which intersects at right angles with the direction indicated by the arrow 20a. The render thread A and the render thread B, and the render thread C and the render thread D are for rendering different bands from the regions (bands) 21 and 22 obtained by dividing the page 20 in the direction indicated by the arrow 20b. For example, the render thread A and the render thread B are for rendering the bands 21. And the render thread C and the render thread D are for rendering different bands the bands 22. It is to be noted that each of the bands 21 and 22 includes a plurality of scan lines. The render thread A and the render thread B reserve a buffer (hereinafter referred to as "buffer of band 21") for drawing the band 21 in the RAM. Likewise, the render thread C and the render thread D reserve a buffer (hereinafter referred to as "buffer of band 22") for drawing the band 22 in the RAM.

FIG. 3 shows an example of scan lines of the band 21.

As shown in FIG. 3, the band 21 includes a scan line SL1, a scan line SL2, a scan line SL3, a scan line SL4, a scan line SL5, (omission), a scan line SL2$n$−4, a scan line SL2$n$−3, a scan line SL2$n$−2, a scan line SL2$n$−1, and a scan line SL2$n$. The render thread A and the render thread B execute their renderings for the band 21 such that the renderings are executed for different scan lines one by one, while skipping a specified number of scan lines which is the number of all the render threads 18b whose target is the band 21, that is, "1", which is obtained by subtracting 1 from "2". For example, in the render thread A, the offset of the scan line at which rendering is started (hereinafter referred to as "start line offset") is 0 and the skip line (hereinafter referred to as "skipped line") is 1. More specifically, since the start line offset is 0, the render thread A starts its rendering from the scan line $SL_1$, skips one scan line at a time, and sequentially reads out the scan line $SL_3$, the scan line $SL_5$, (omission), the scan line $SL_{2n-3}$, the scan line $SL_{2n-1}$ as targets of the rendering. On the other hand, the render thread B has a start line offset of 1 and a skip line of 1. More specifically, since the start line offset is 1, the render thread B starts its rendering from the scan line SL2, skips one scan line at a time, and reads out the scan lines $SL_4$, (omission), the scan line $SL_{2n-4}$, the scan line $SL_{2n-2}$ and the scan line $SL_{2n}$ as targets of the rendering. It is to be noted that in each of the scan lines shown in FIG. 3, n is an integer of 5 or more.

Similar to the render thread A and the render thread B, the render thread C and the render thread D execute their renderings for mutually different scan lines every other scan line. For example, the render thread C has a start line offset of 0 and a skip line of 1. On the other hand, the render thread D has a start line offset of 1 and a skip line of 1.

Figure 4A:
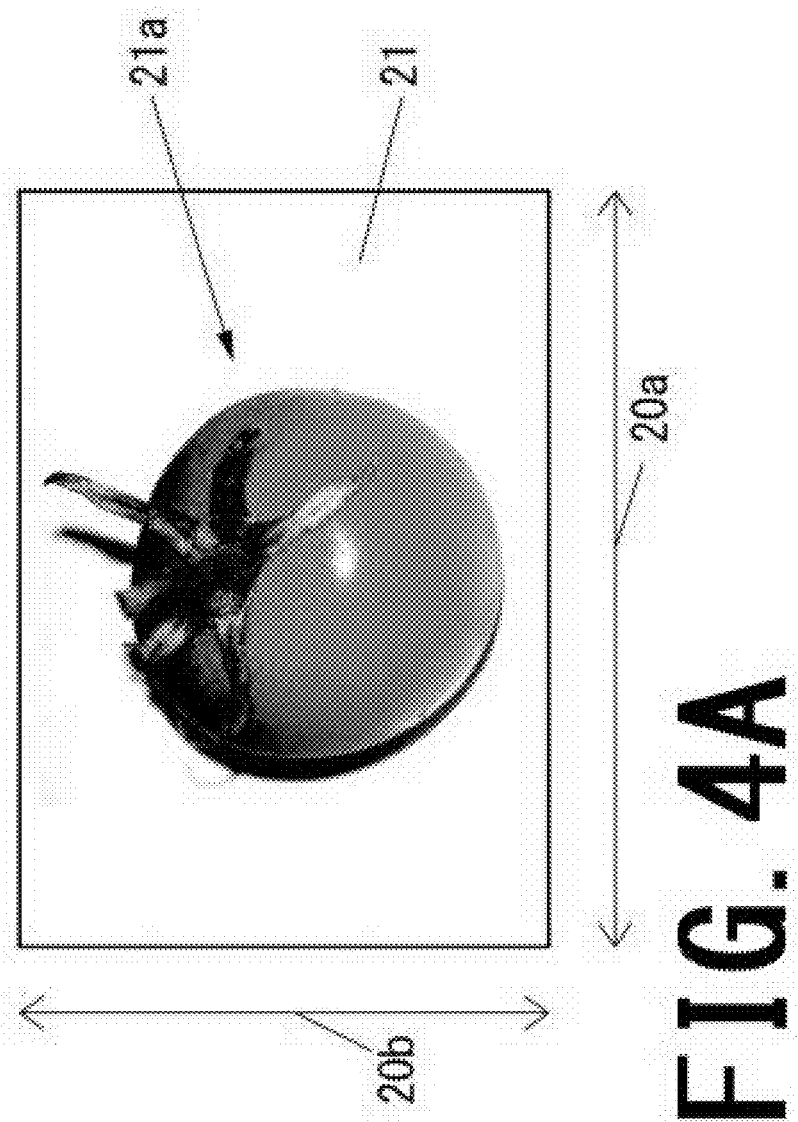
FIG. 4A shows an example of an object included in the band shown in FIG. 2.
Figure 4B:
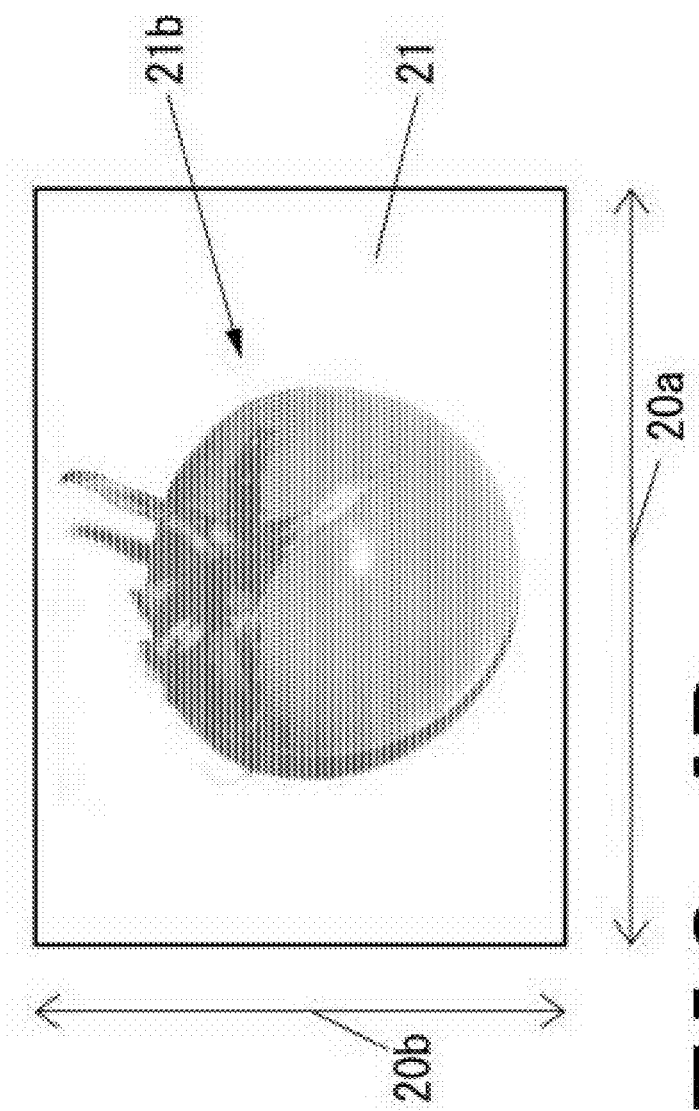
FIG. 4B shows an example of a portion, among the objects shown in FIG. 4A, to be rendered by a render thread A.
Figure 4C:
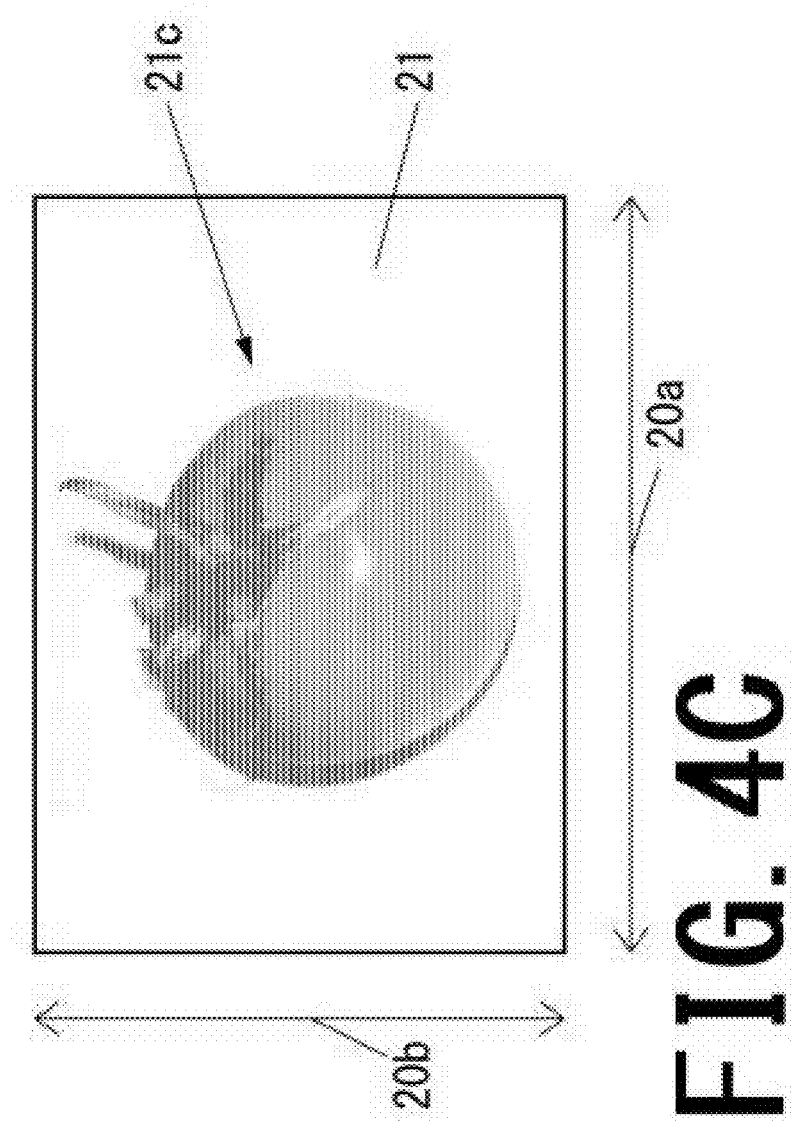
FIG. 4C shows an example of a portion, among the objects shown in FIG. 4A, to be rendered by a render thread B.

FIG. 4A shows an example of an object included in the band 21. FIG. 4B shows an example of a section to be rendered by the render thread A among the objects shown in FIG. 4A. FIG. 4C shows an example of a section to be rendered by the render thread B among the objects shown in FIG. 4A.

In a case where the object 21a shown in FIG. 4A is included in the band 21, if the portion of the object 21a to be rendered by the render thread A is the portion 21b shown in FIG. 4B, the portion to be rendered by the render thread B of the object 21a is the portion 21c shown in FIG. 4C. As shown in FIG. 4B and FIG. 4C, there is no remarkable difference between the portion 21b to be rendered by the render thread A and the portion 21c to be rendered by the render thread B.

In the above description, the case is described where the object 21a shown in FIG. 4A is included in the band 21. Depending on the shape of the object included in the band 21, sometimes there may be a remarkable difference between the section to be rendered by the render thread A and the section to be rendered by the render thread B. However, the render thread A and the render thread B are rendered for different scan lines which are every other scan line. For this reason, as long as the object included in the band 21 is not a special shape, there is usually no remarkable difference between the section to be rendered by the render thread A and the section to be rendered by the render thread B. Thus, normally, there is no remarkable difference between the render thread A and the render thread B in amount of rendering process.

Hereinbelow, the difference between the process amount of the rendering by the render thread A and the process amount of the rendering by the render thread B will be described in detail.

Figure 5B:
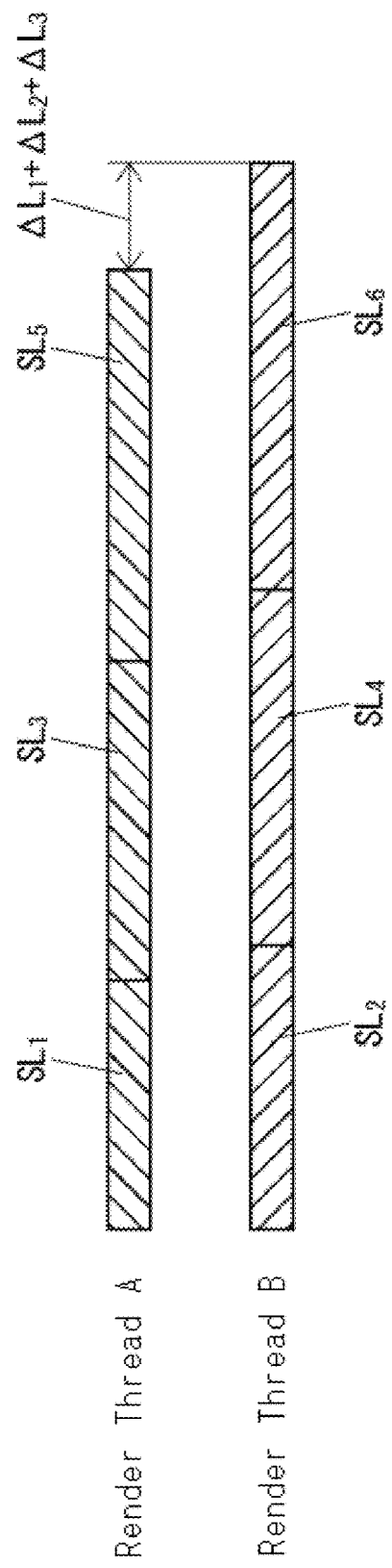
FIG. 5B shows a rendering amount of each of the render thread A and the render thread B when rendering the object shown in FIG. 5A by the render thread A and the render thread B.

FIG. 5A shows a trapezoidal object 30 made up of six scan lines as an example of an object included in the band 21. In FIG. 5B, the object 30 is rendered by the render thread A and the render thread B, and the render object 50 and the object 60 are trapezoidal objects each of which is made up of six scanning lines.

Regarding the object shown in FIG. 5A, if the scan lines $SL_1$, $SL_2$, $SL_3$, (omission), and $SL_6$ are indicated as $Length_1$, $Length_2$, $Length_3$, (omission), and $Length_6$, respectively, $Length_2$, $Length_3$, (omission), and $Length_6$ can be represented as "$Length_1+\Delta L_1$", "$Length_1+\Delta L_1+\Delta L_2$", (omission), and "$Length_1+\Delta L_1+\Delta L_2+\Delta L_3+\Delta L_4+\Delta L_5$", respectively. Here, $\Delta L_1$, $\Delta L_2$, (omission), and $\Delta L_6$ are "$Length_2-Length_1$", "$Length_3-Length_2$", (omission), and "$Length_6-Length_5$", respectively.

At this stage, it is supposed that the odd-numbered scan lines, i.e., the scan lines $SL_1$, $SL_3$, and $SL_5$ are rendered by the render thread A, while the even-numbered scan lines i.e., the scan lines $SL_2$, $SL_4$, $SL_6$ are rendered by the render thread B.

The total length obtained when the object 30 is rendered by the render thread A is "$(Length_1)+(Length_1+\Delta L_1+\Delta L_2)+(Length_1+\Delta L_1+\Delta L_2+\Delta L_3+\Delta L_4)$" i.e., "$(Length_1)\times 3+\Delta L_1\times 2+\Delta L_2\times 2+\Delta L_3+\Delta L_4$". While, total length obtained when the object 30 is rendered by the render thread B is "$(Length_1+\Delta L_1)+(Length_1+\Delta L_1+\Delta L_2+\Delta L_3)+(Length_1+\Delta L_1+\Delta L_2+\Delta L_3+\Delta L_4+\Delta L_5)$" i.e., "$(Length_1)\times 3+\Delta L_1\times 3+\Delta L_2\times 2+\Delta L_3\times 2+\Delta L_4+\Delta L_5$". Thus, the surplus rendering length of the render thread B relative to the render thread A is "$\{(Length_1)\times 3+\Delta L_1\times 3+\Delta L_2\times 2+\Delta L_3\times 2+\Delta L_4+\Delta L_5\}-\{(Length_1)\times 3+\Delta L_1\times 2+\Delta L_2\times 2+\Delta L_3+\Delta L_4\}$, i.e., "$\Delta L_1+\Delta L_3+\Delta L_5$". As described above, the difference between the sum of the lengths rendered by the render thread A for the object 30 and the sum of the lengths rendered by the render thread B for the object 30, is "$\Delta L_1+\Delta L_3+\Delta L_5$" as shown in FIG. 5B.

The above description has been made as to the case where the object 30 is made up of six scan lines. However, the difference between the render thread A and the render thread B in rendered length when the object 30 is made up of even-numbered (2m) scan lines can be generalized as expressed in Mathematical Formula 1, where m is an integer of 1 or more.

$$\left|\sum_{n=1}^{m} \Delta L_{2n-1}\right| \quad \text{[Math. 1]}$$

Figure 6B:
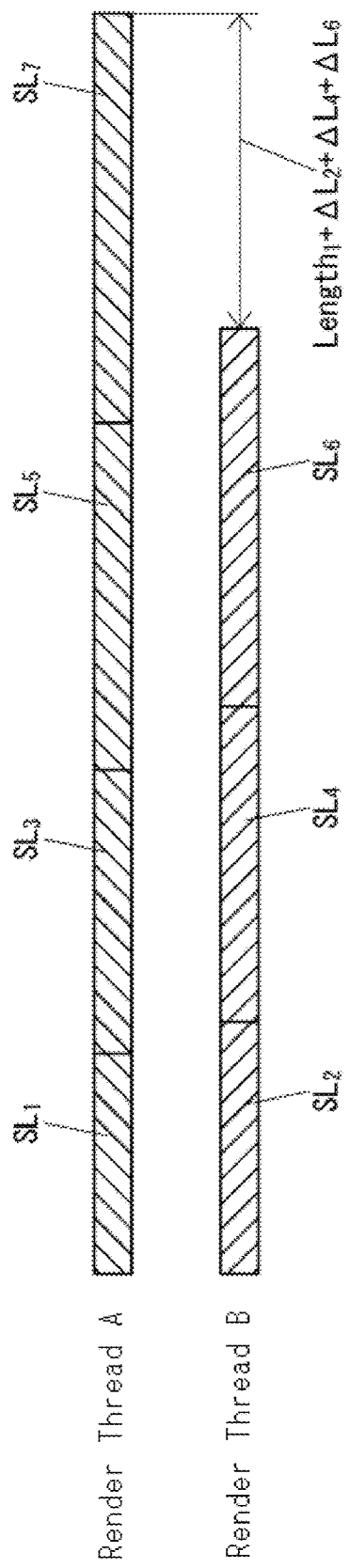
FIG. 6B shows a rendering amount of each of the render thread A and the render thread B when rendering the object shown in FIG. 6A by the render thread A and the render thread B.

FIG. 6A shows a trapezoidal object 40, as example of an object included in the band 21, which is made up of seven scan lines. In the example shown in FIG. 6A, the scan line SL7 is added below the scan line SL6 of the object shown in FIG. 5A. FIG. 6B shows a process amount of each of the render thread A and the render thread B when the object 40 is rendered by the render thread A and the render thread B.

As to the object 40 shown in FIG. 6A, it is supposed that the odd-numbered scan lines, i.e., the scan lines SL1, SL3, SL5, and SL7 are rendered by the render thread A, while the even-numbered scan lines i.e., the scan lines $SL_2$, $SL_4$, $SL_6$ are rendered by the render thread B.

The total length obtained when the object 30 is rendered by the render thread A is "$(Length_1)+(Length_1+\Delta L_1+\Delta L_2)+(Length_1+\Delta L_1+\Delta L_2+\Delta L_3+\Delta L_4)+(Length_1+\Delta L_1+\Delta L_2+\Delta L_3+\Delta L_4+\Delta L_5+\Delta L_6)$" i.e., "$(Length_1)\times 4+\Delta L_1\times 3+\Delta L_2\times 3+\Delta L_3\times 2+\Delta L_4\times 2+\Delta L_5+\Delta L_6$". While, total length obtained when the object 30 is rendered by the render thread B is "$(Length_1+\Delta L_1)+(Length_1+\Delta L_1+\Delta L_2+\Delta L_3)+(Length_1+\Delta L_1+\Delta L_2+\Delta L_3+\Delta L_4+\Delta L_5)$" i.e.," $(Length_1)\times 3+\Delta L_1\times 3+\Delta L_2\times 2+\Delta L_3\times 2+\Delta L_4+\Delta L_5$". Thus, the surplus rendering length of the render thread B relative to the render thread A is "$\{(Length_1)\times 4+\Delta L_1\times 3+\Delta L_2\times 3+\Delta L_3\times 2+\Delta L_4\times 2+\Delta L_5+\Delta L_6\}-\{(Length_1)\times 3+\Delta L_1\times 3+\Delta L_2\times 2+\Delta L_3\times 2+\Delta L_4+\Delta L_5\}$, i.e., "$\Delta L_1+\Delta L_3+\Delta L_5+\Delta L_6$". As described above, the difference between the sum of the lengths rendered by the render thread A for the object 40 and the sum of the lengths rendered by the render thread B for the object 40, is "$Length_1+\Delta L_2+\Delta L_4+\Delta L_6$" as shown in FIG. 6B.

The above description has been made as to the case where the object 40 is made up of seven scan lines. However, the difference between the render thread A and the render thread B in rendered length when the object 40 is made up of odd-numbered (2m+1) scan lines can be generalized as expressed in Mathematical Formula 2, where m is an integer of 1 or more.

$$\left|Length_1 + \sum_{n=1}^{m} \Delta L_{2n}\right| \quad \text{[MATH. 2]}$$

As described above, there is the difference between the render thread A and the render thread B in rendered length as indicated by Formula 1 or Formula 2 and therefore no remarkable difference is found usually as long as the object that has been rendered is not a special shape.

The preceding description is in association with the render thread A and the render thread B. However, similar to the process amount of the rendering by the render thread A and the process amount of the rendering by the render thread B, with respect to the process amount of the rendering by the render thread C and the process amount of the rendering by the render thread D, no remarkable difference is found between the both process amounts as long as the object included in the band 21 has not a special shape.

The render thread A and render thread B execute their renderings depending on not the number of counted scan lines with reference to each of the objects included in the band 21 but on the number of scan lines counted with reference to the band 21 i.e. on the scan lines counted with reference to the coordinates, in the buffer of the band 21. The details will be described below.

Figure 7A:
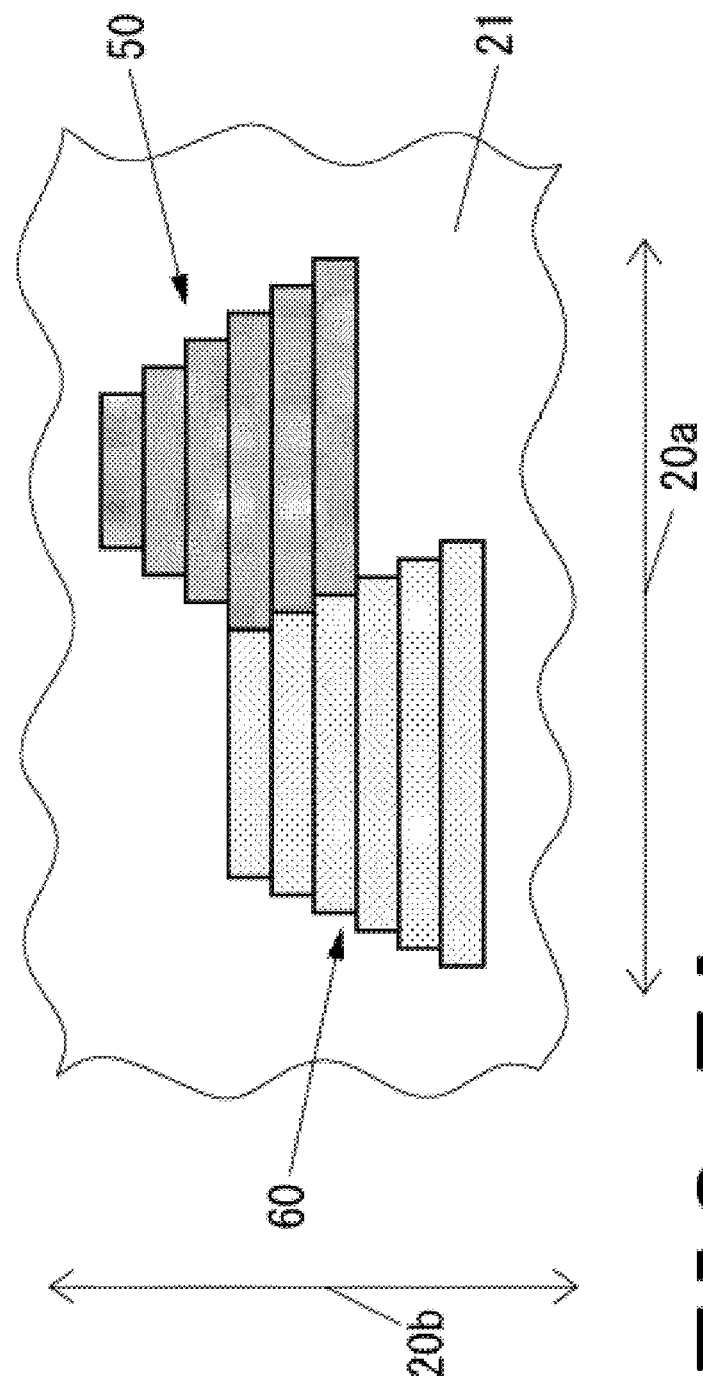
FIG. 7A shows an example of the object shown in FIG. 2 in which two objects are in an overlay relationship.
Figure 7B:
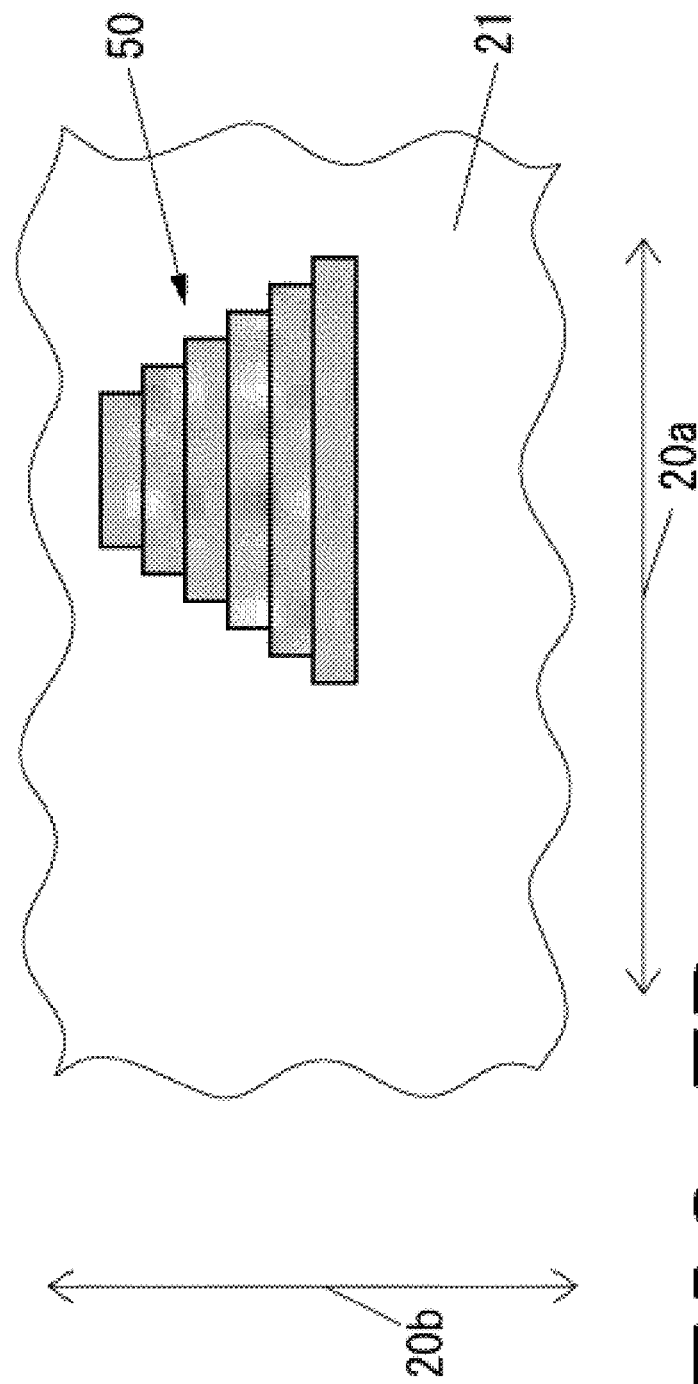
FIG. 7B shows one of the objects shown in FIG. 7A overlaying on the other object.
Figure 7C:
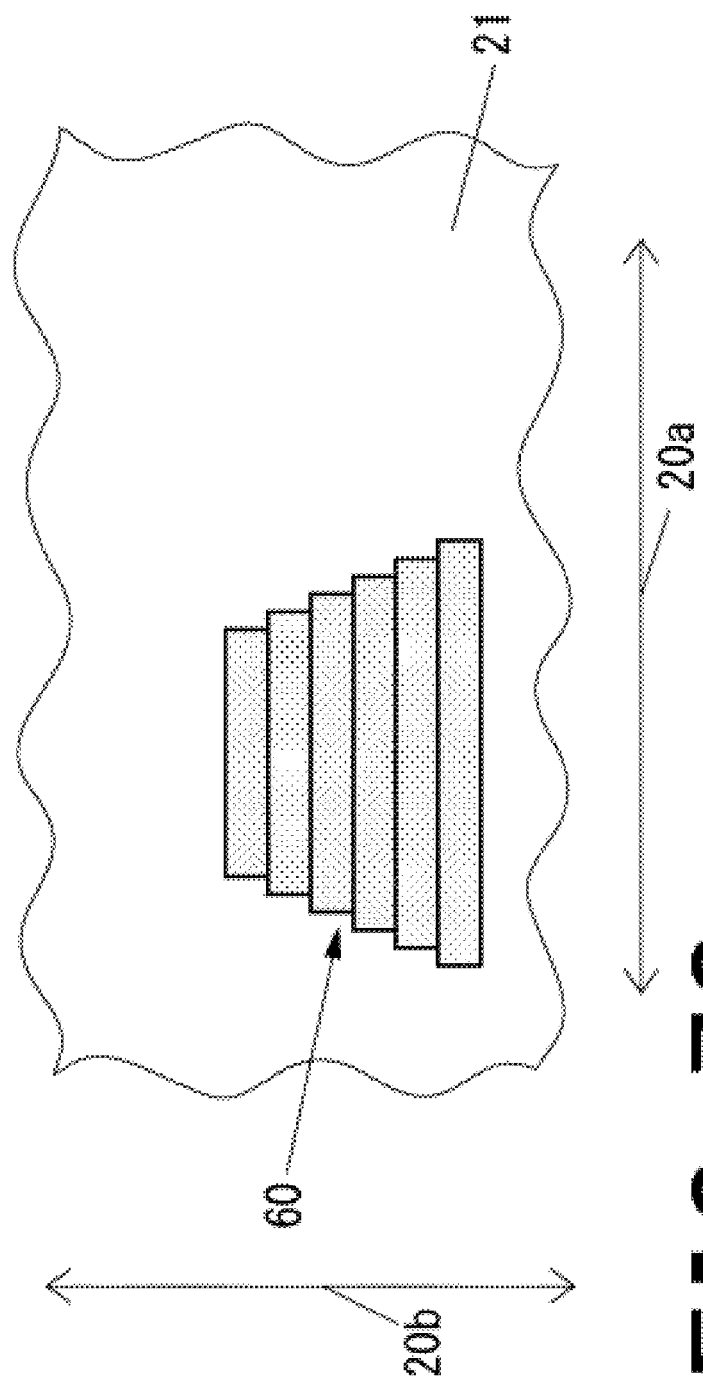
FIG. 7C shows one of the objects shown in FIG. 7A which is overlaid by the other object.

FIG. 7A shows an example of the band 21 in which are included an object 50 and an object 60 in an overlay manner. FIG. 7B shows an overlay relationship between the object 50 and the object 60 under which the object 50 is in an overlaid state. FIG. 7C shows an overlay relationship between the object 50 and the object 60 under which the object 60 is in an overlaying state.

A consideration will be made as to overlaying the object 60 shown in FIG. 7C on the object 50 shown in FIG. 7B to create the image shown in FIG. 7A. The object 50 and the object 60 are trapezoidal objects both of which are made up of seven scan lines.

It is supposed that odd-numbered scan lines are rendered by the render thread A and even-numbered scan lines are rendered by render thread B.

An assumption is made as to a case where the render thread A and the render thread B execute their renderings depending on the number of counted scan lines with reference to each of the objects included in the band 21.

Figure 8A:
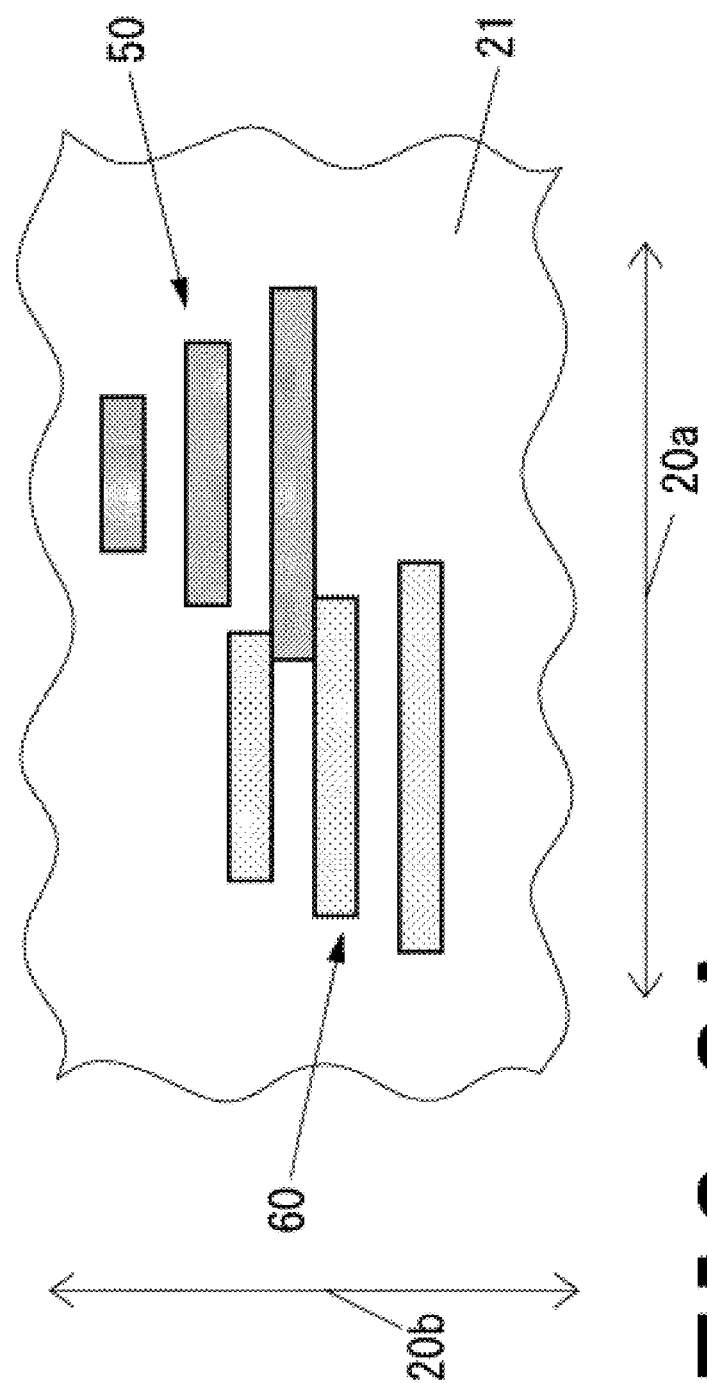
FIG. 8A shows a portion rendered by the render thread A among two objects shown in FIG. 7A when rendering is executed based on scan lines counted with reference to each of the objects included in the band.
Figure 8B:
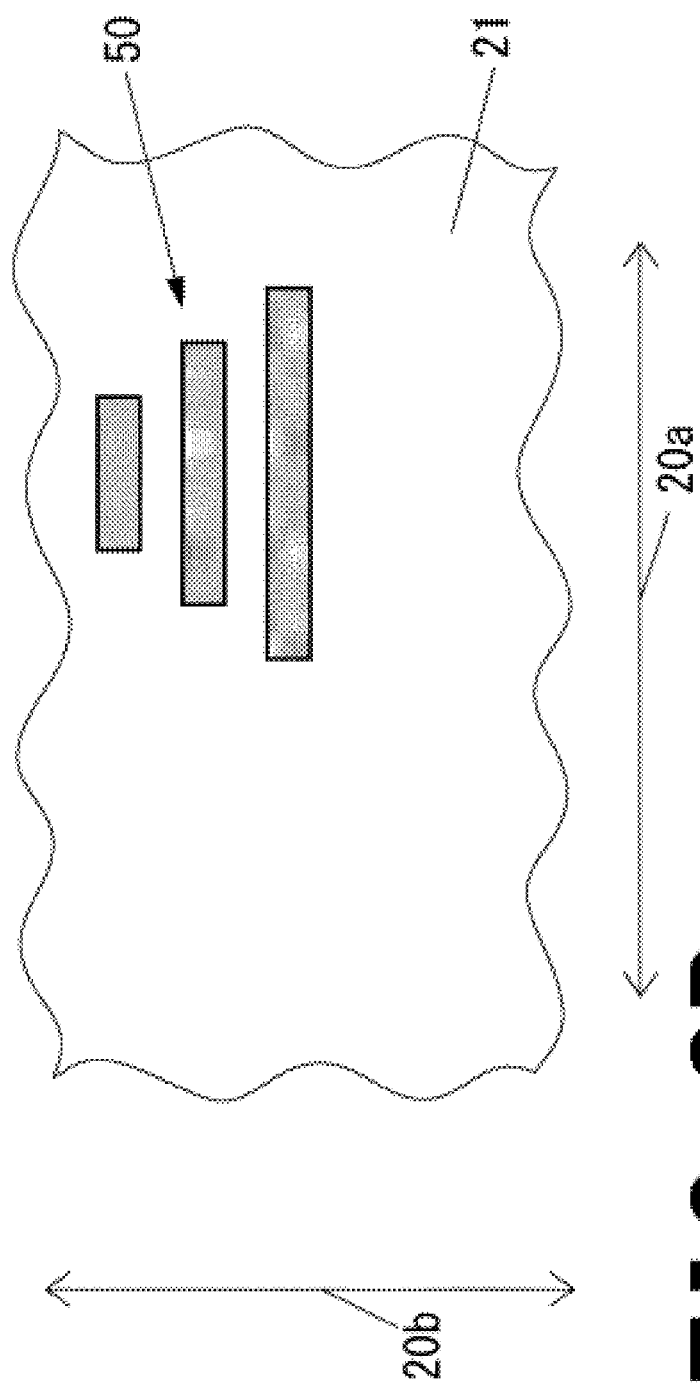
FIG. 8B shows a portion rendered by the render thread A among two objects shown in FIG. 7B when rendering is executed based on scan lines counted with reference to each of the objects included in the band.
Figure 8C:
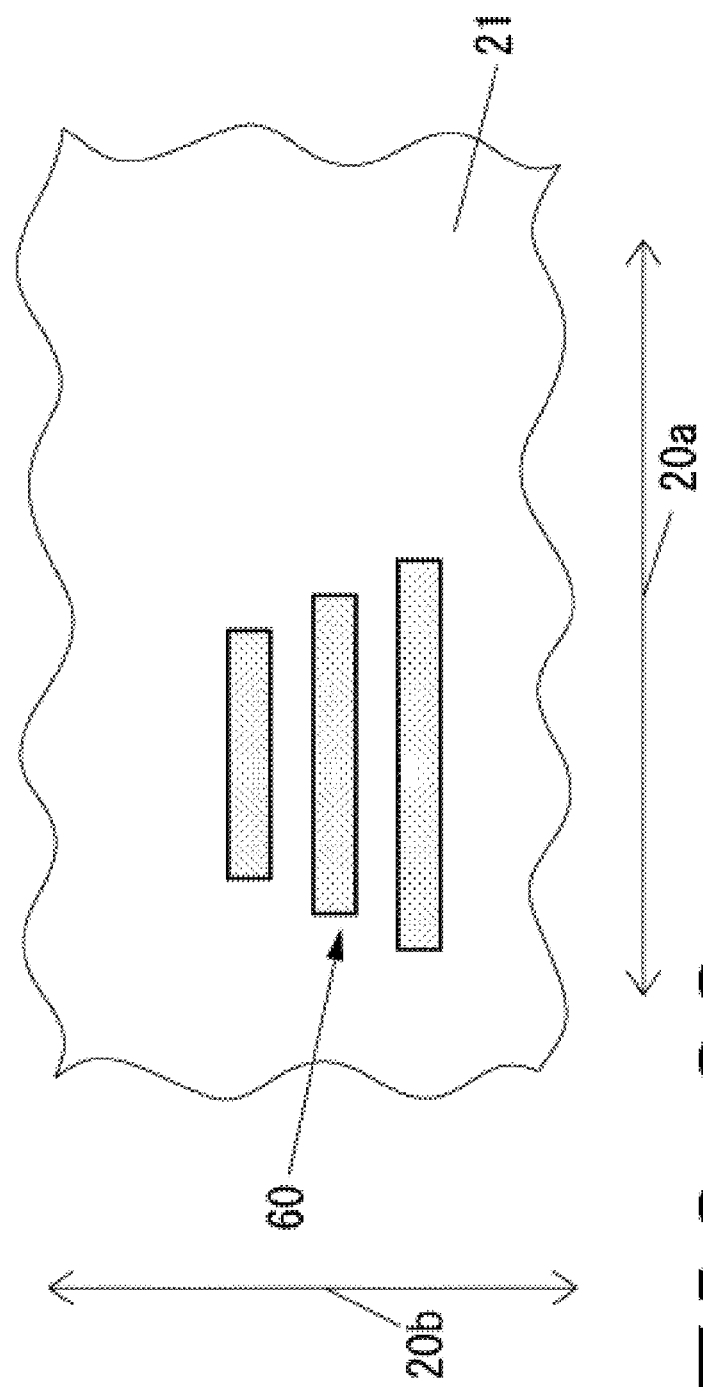
FIG. 8C shows a portion rendered by the render thread A among two objects shown in FIG. 7C when rendering is executed based on scan lines counted with reference to each of the objects included in the band.

In a case where the render thread A executes its rendering depending on the number of counted scan lines with reference to each of the objects included in the band 21, as shown in FIG. 8, the rendering is executed for the object 50 depending on the number of counted odd-numbered scan lines in the object 50. On the other hand, the rendering is executed for the object 60 depending on the number of counted even-numbered scan lines in the object 60.

Figure 9A:
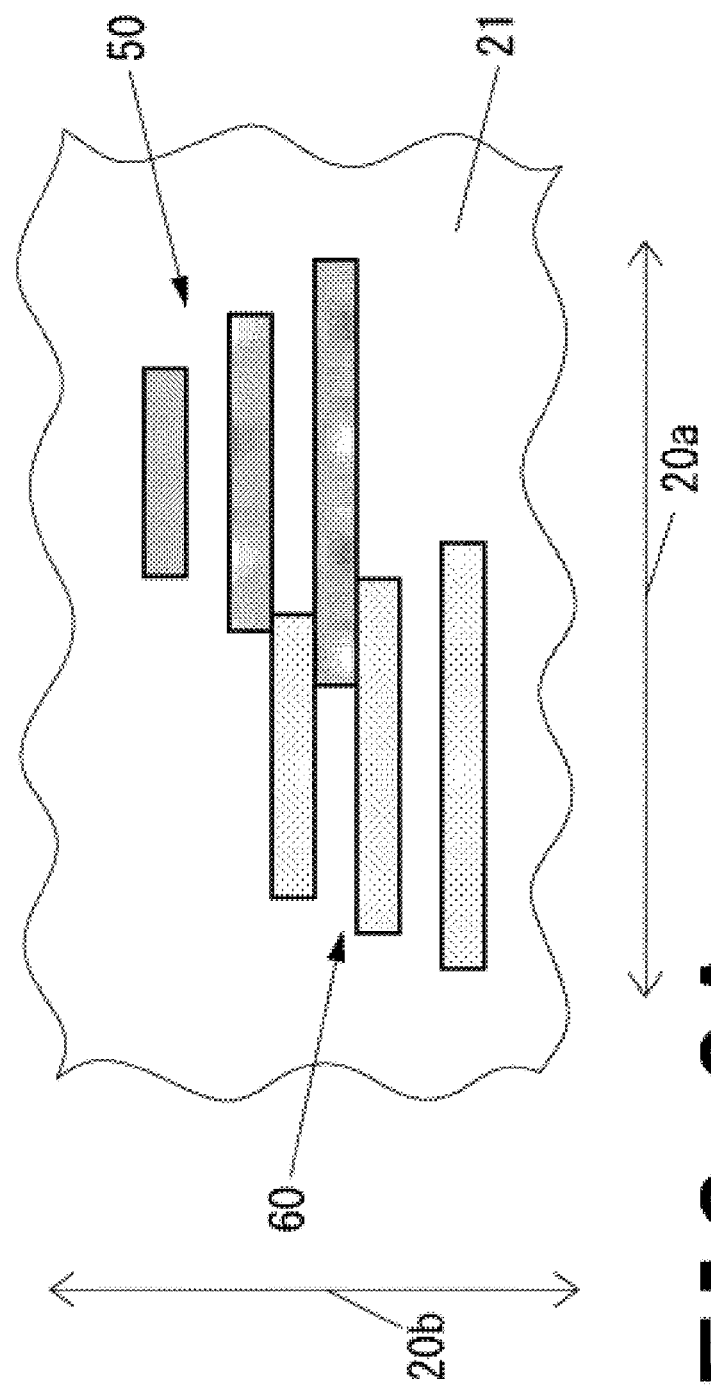
FIG. 9A shows a portion rendered by the render thread B among two objects shown in FIG. 7A when rendering is executed based on scan lines counted with reference to each of the objects included in the band.
Figure 9B:
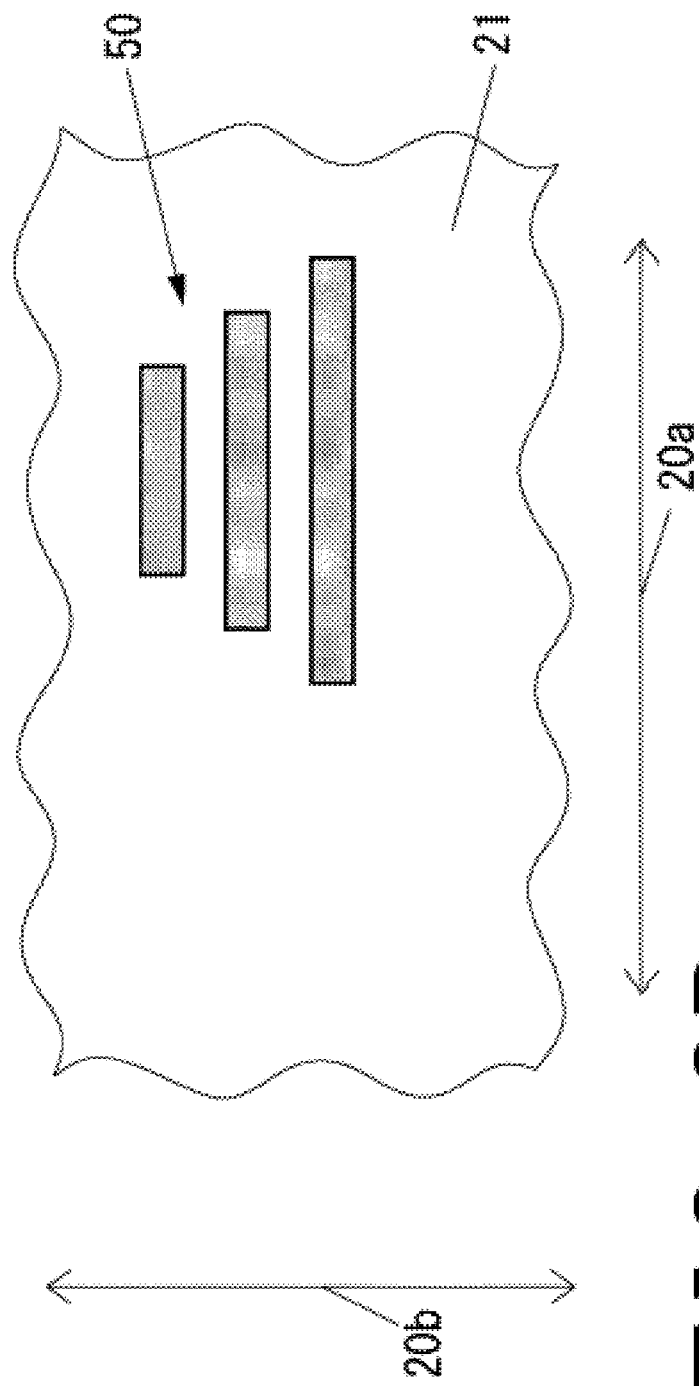
FIG. 9B shows a portion rendered by the render thread B among two objects shown in FIG. 7B when rendering is executed based on scan lines counted with reference to each of the objects included in the band.

In a case where the render thread B executes its rendering depending on the number of counted scan lines with reference to each of the objects included in the band 21, as shown in FIG. 9, the rendering is executed for the object 50 depending on the number of counted even-numbered scan lines in the object 50. On the other hand, the rendering is executed for the object 60 depending on the number of counted odd-numbered scan lines in the object 60.

Figure 10:
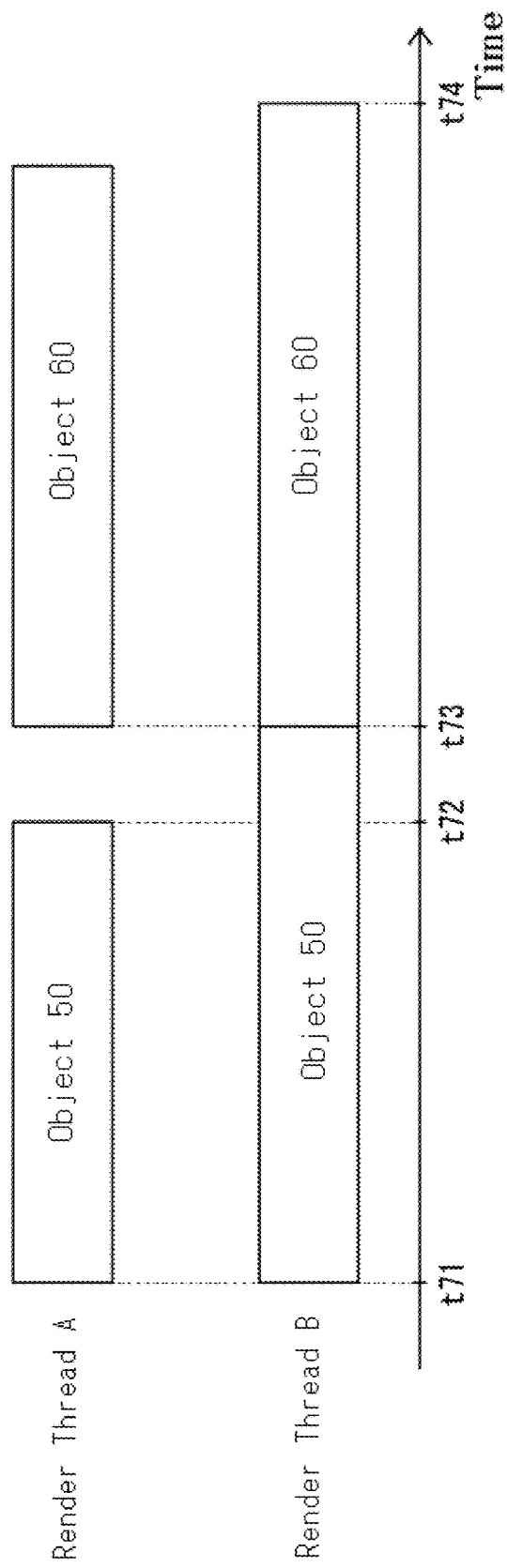
FIG. 10 shows the processing timings when the render thread A and the render thread B execute their renderings based on scan lines counted with reference to each of the objects included in the band shown in FIG. 2.

FIG. 10 show process timings in the case where the render thread A and the render thread execute their renderings depending on the number of counted scan lines with referenced to each of the objects included in the band 21.

As shown in FIG. 10, in the case where the render thread A and the render thread execute their renderings depending on the number of counted scan lines with reference to each of the objects included in the band 21, the render thread A and the render thread B can start their renderings for the object 50 at the same time (t71). However, it is necessary for a portion (see FIG. 8C) of the object 60 which is to be rendered by the render thread A to overlay on a portion (see FIG. 9B) of the object 50 which is to be rendered by the render thread B. Therefore, even if the render thread A completes (t72) its rendering for its concerned portion, it is necessary for the render thread A to wait until the render thread B completes (t73) its rendering for its concerned portion. When the render thread B completes its rendering for its concerned portion, the render thread A and the render thread B can start rendering for the object 60 at the same time (t73). As described above, the render thread A and the render thread B need to synchronize with each other if the render thread A and the render thread B execute their renderings depending on the number of counted scan lines with reference to each of the objects included in the band 21.

However, actually, the render thread A and render thread B execute their renderings depending on not the number of counted scan lines with reference to each of the objects included in the band 21 but on the number of scan lines counted with reference to the band 21.

Figure 11B:
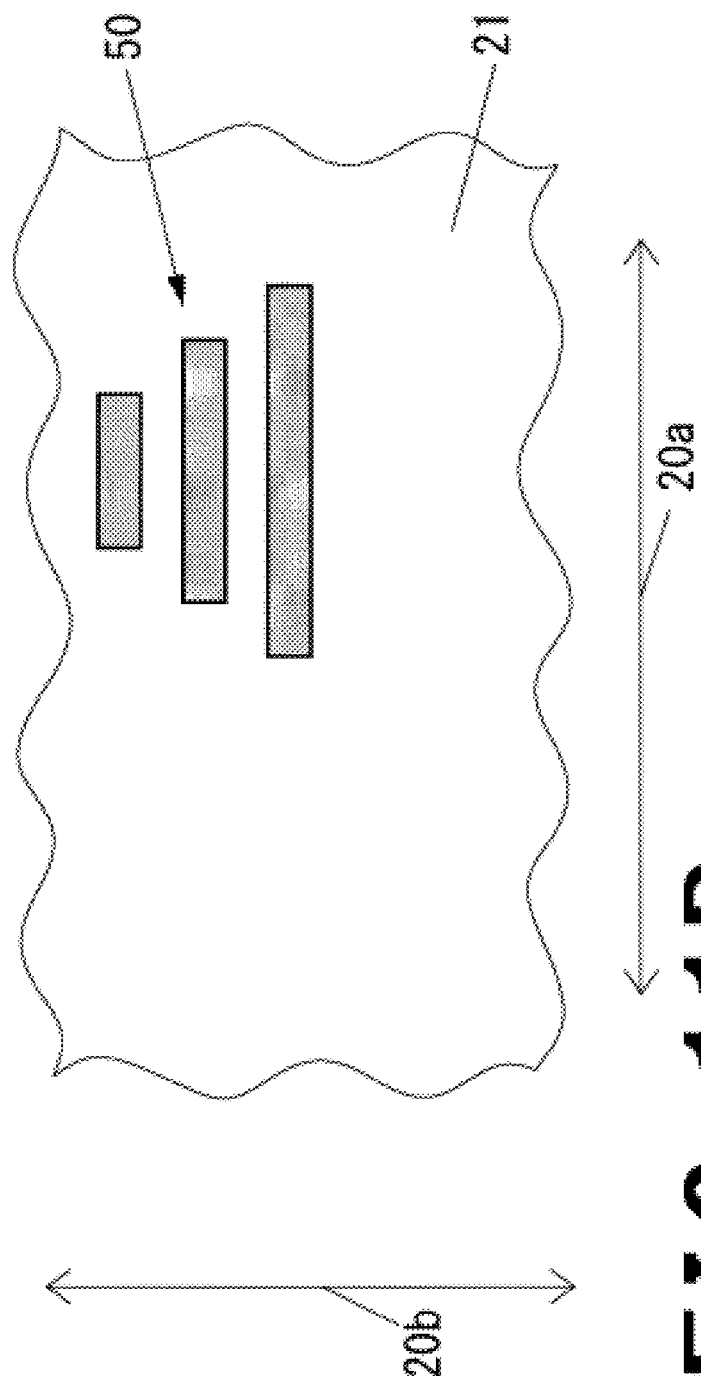
FIG. 11B shows a portion rendered by the render thread A among two objects shown in FIG. 7B when rendering is executed based on scan lines counted with reference to the band.
Figure 11C:
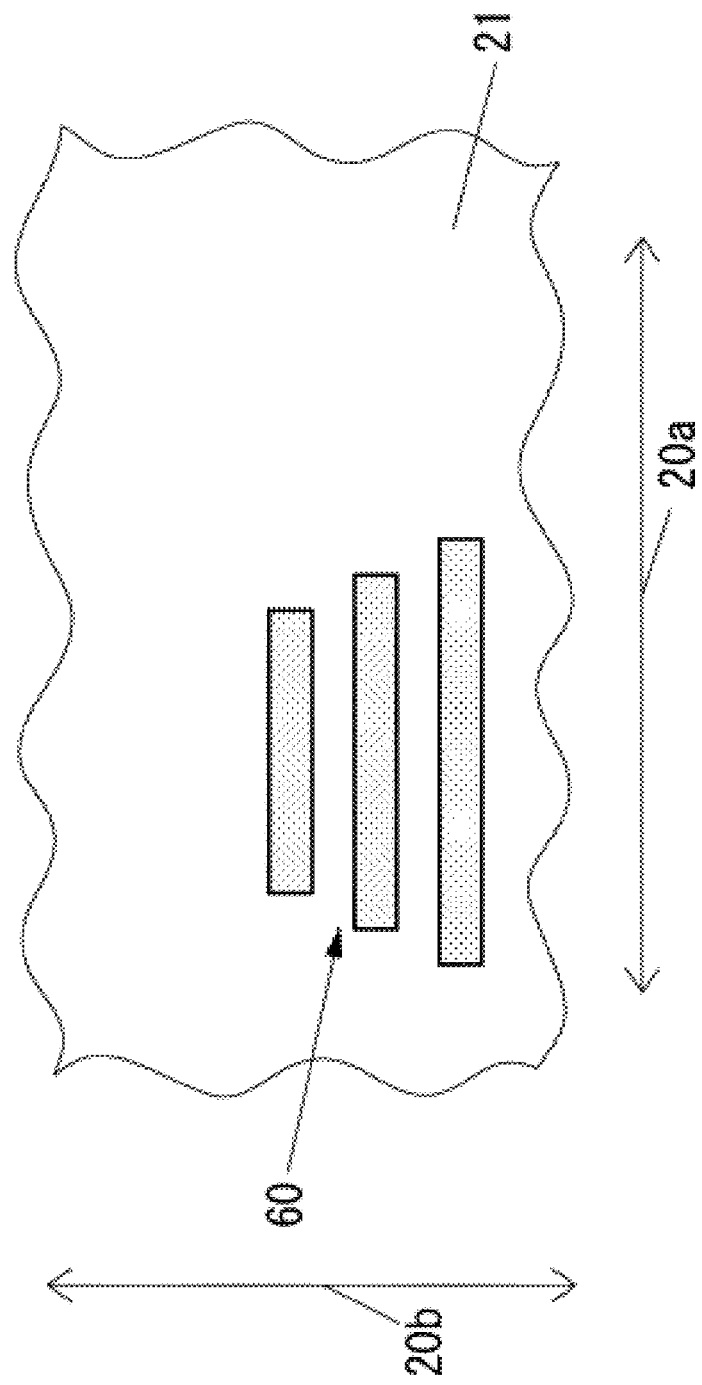
FIG. 11C shows a portion rendered by the render thread A among two objects shown in FIG. 7C when rendering is executed based on scan lines counted with reference to the band.

If the render thread A executes its rendering depending on the number of scan lines counted with reference to the band 21, as shown in FIG. 11, such a rendering is executed for both the object 50 and the object 60 depending on the number of odd-numbered scan lines counted with reference to the band 21.

Figure 12A:
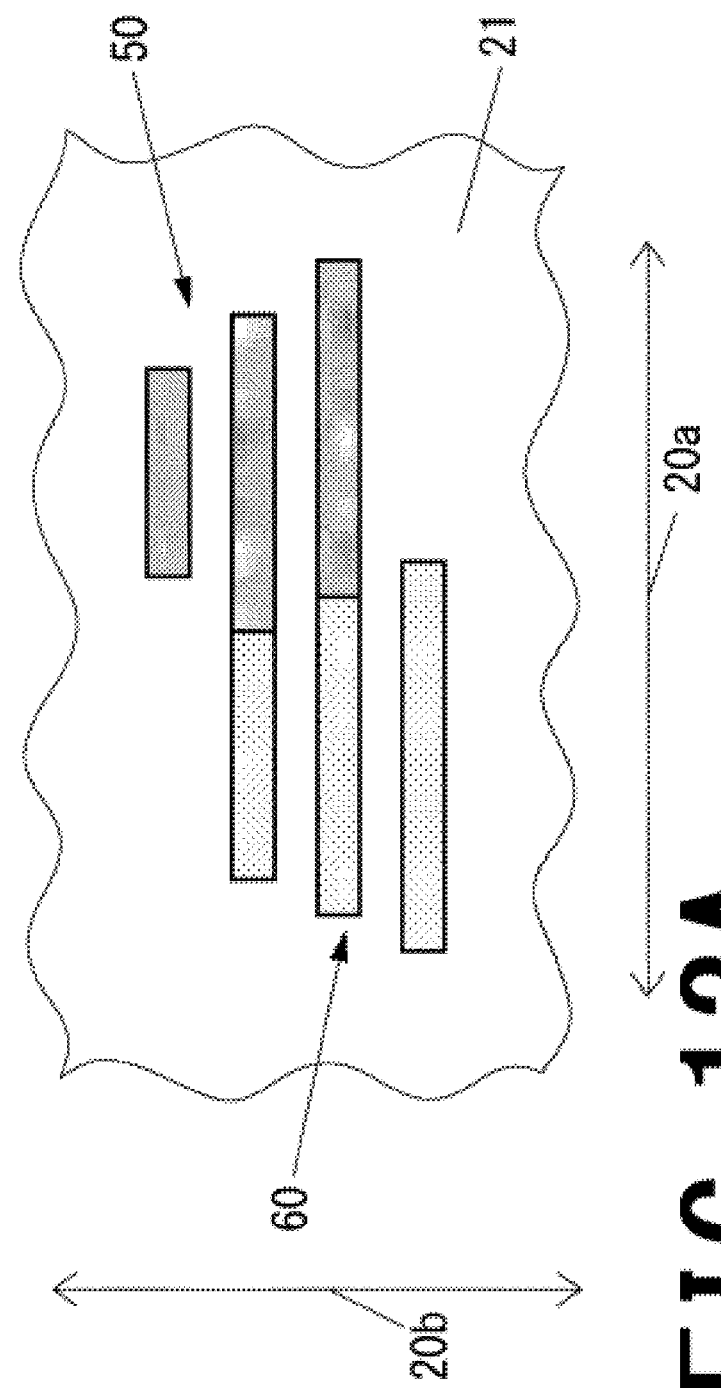
FIG. 12A shows a portion rendered by the render thread B among two objects shown in FIG. 7A when rendering is executed based on scan lines counted with reference to the band.
Figure 12B:
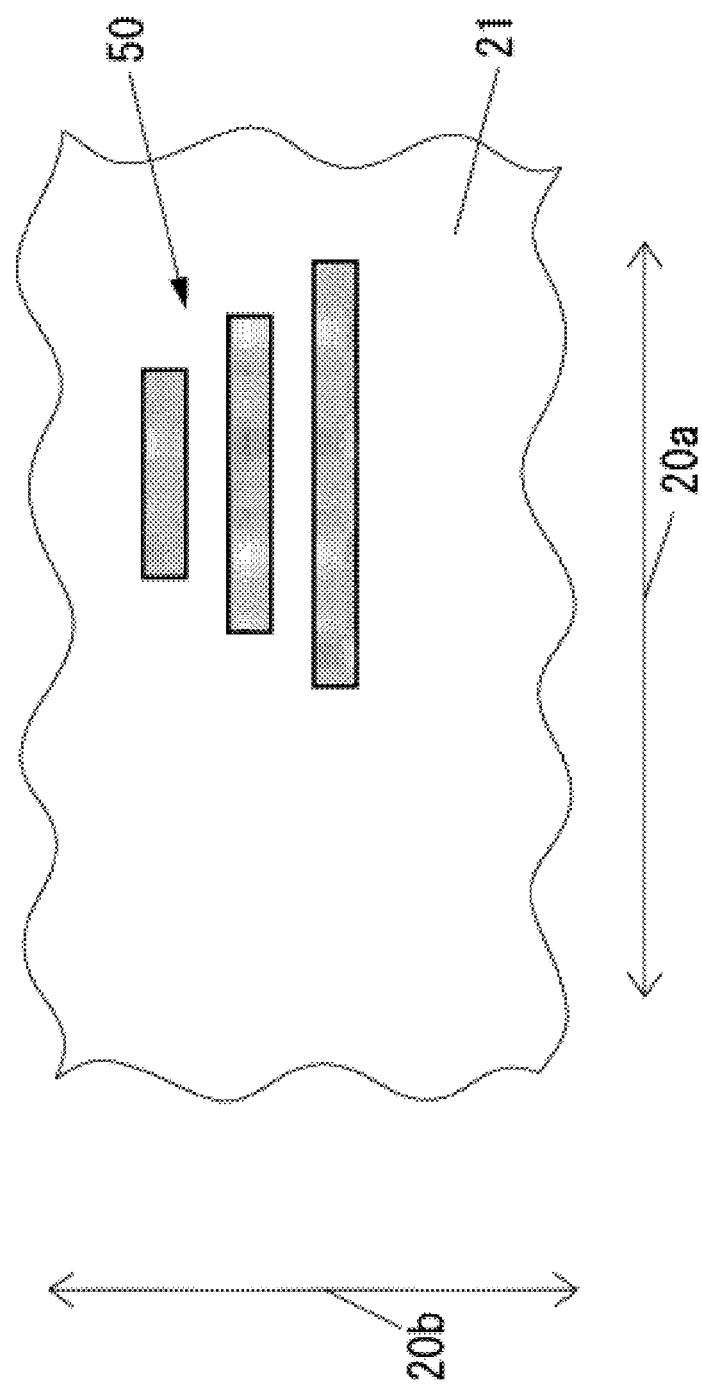
FIG. 12B shows a portion rendered by the render thread B among two objects shown in FIG. 7B when rendering is executed based on scan lines counted with reference to the band.
Figure 12C:
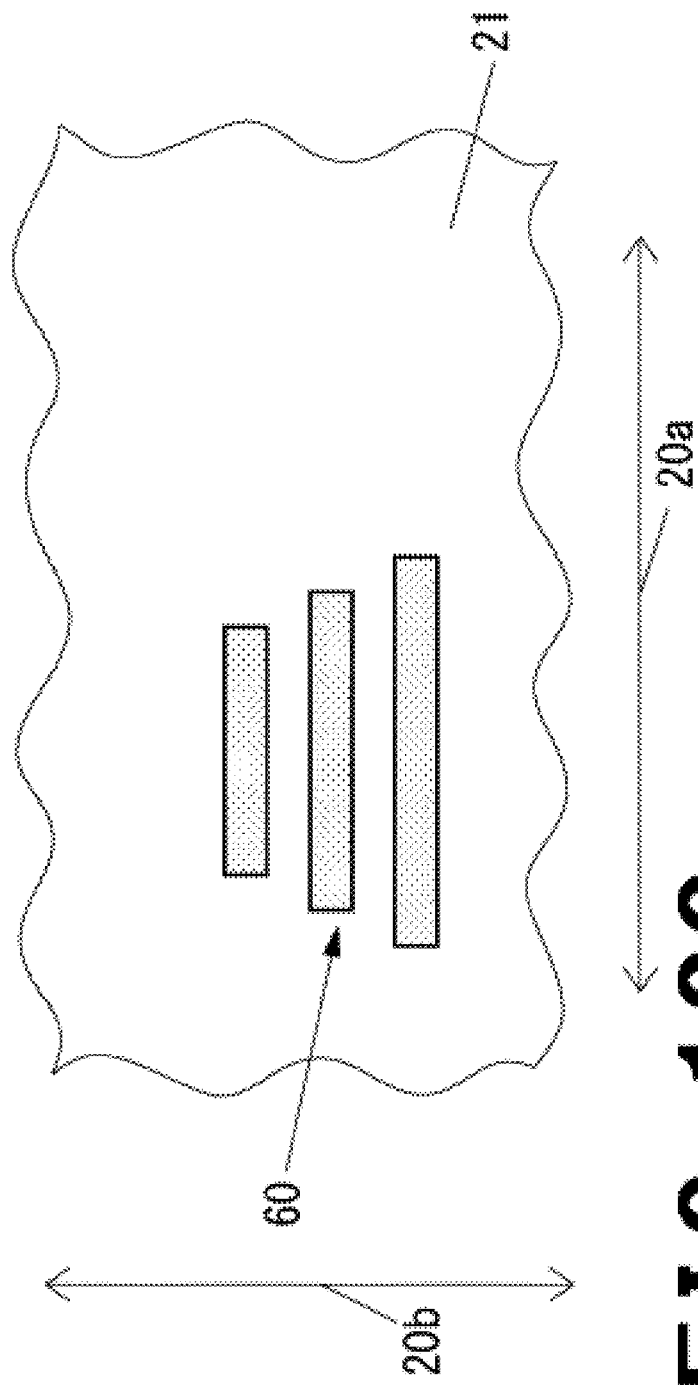
FIG. 12C shows a portion rendered by the render thread B among two objects shown in FIG. 7C when rendering is executed based on scan lines counted with reference to the band.

If the render thread B executes its rendering depending on the number of scan lines counted with reference to the band 21, as shown in FIG. 12, such a rendering is executed for both the object 50 and the object 60 depending on the number of even-numbered scan lines counted with reference to the band 21 as a reference.

Figure 13:
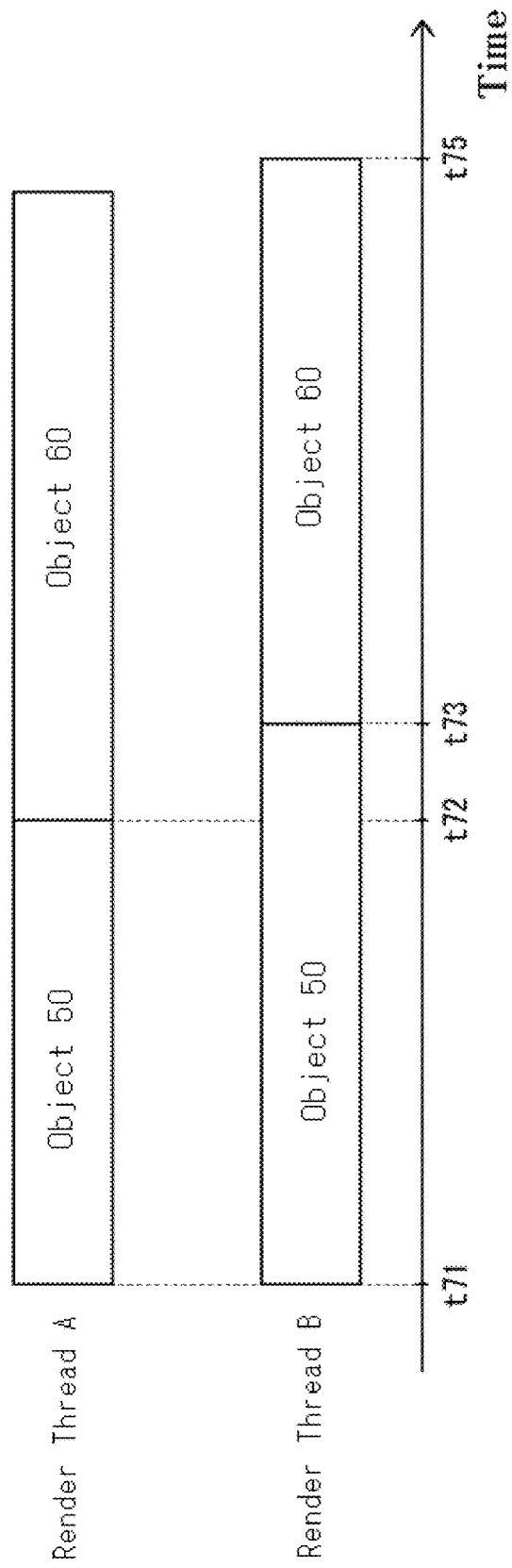
FIG. 13 shows the processing timings when the render thread A and the render thread B execute their renderings based on scan lines counted with reference to the band shown in FIG. 2.

FIG. 13 show process timings in a case where the render thread A and the render thread B execute their renderings depending on the number of counted scan lines on the basis of the band 21.

As shown in FIG. 13, in the case where the render thread A and the render thread B execute their renderings depending on the number of counted scan lines with reference to the band 21, the render thread A and the render thread B can start their renderings for the object 50 at the same time (t71). At this stage, the render thread A and the render thread B execute their renderings depending on the number of counted scan lines with reference to the band 21. For this reason, a portion (see FIG. 11C of the object 60 which is to be rendered by the render thread A is not caused to overlay on a portion (see FIG. 12B) of the object 50 which is to be rendered by the render thread B. Therefore, if the render thread A completes (t72) its rendering for its concerned portion in the object 50, it is possible for the render thread A to start (t72) executing its rendering for the object 60 independent of whether or not the render thread A completes its rendering for its concerned portion of the object 50 (t73). Likewise, if the rendering thread B completes (t73) its rendering for its concerned portion in the object 50, it is possible for the render thread B to start (t73) executing its rendering for the object 60 independent of whether or not the render thread B completes its rendering for its concerned portion of the object 50 (t72). That is to say, the render thread A and the render thread B do not need to synchronize with each other if the render thread A and the render thread B execute their renderings depending on the number of counted scan lines with reference to the band 21.

As apparent from the preceding description, the end timing (t75 (see FIG. 13)) of the case where the render thread A and the render thread B execute their renderings depending on the number of counted scan lines with reference to the band 21 can be earlier than the end timing (t74

(see FIG. 10)) of the case where the render thread A and the render thread B execute their renderings depending on the number of counted scan lines with reference to each of the objects of the band 21.

In the above, the description has been made as to the render thread A and the render thread B. However, also, the render thread C and render thread D execute their renderings depending on not the number of counted scan lines with reference to each of the objects included in the band 22 but on the number of scan lines based on the band 21 i.e. on the scan lines counted with reference to the coordinates in the buffer of the band 22.

Next, a description will be made as to how the MFP 10 operates.

Figure 14:
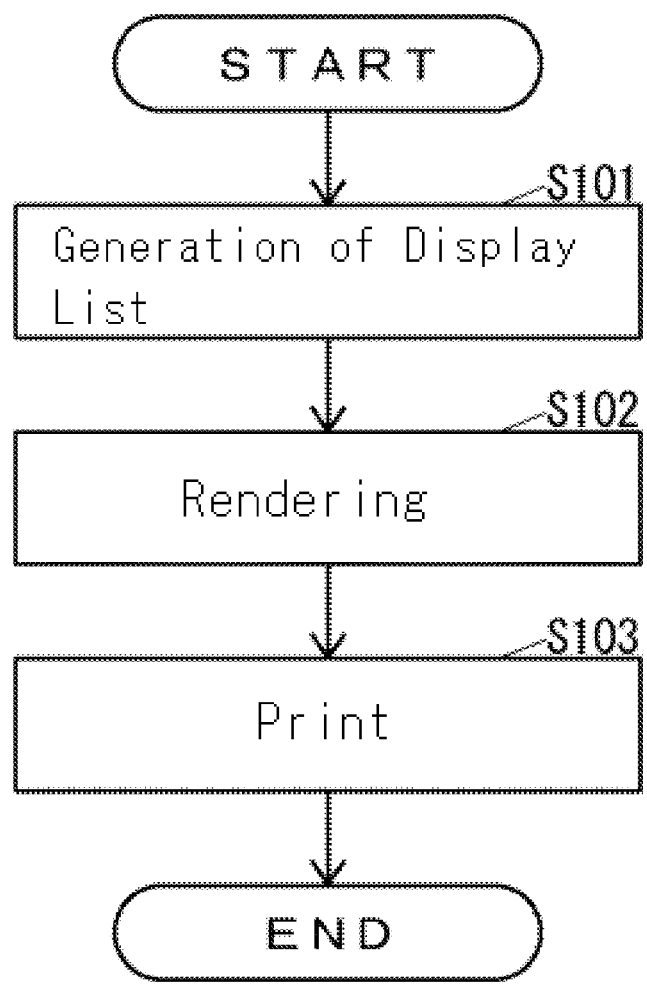
FIG. 14 is a flowchart of the operation of the MFP shown in FIG. 1 when printing is executed based on a page description language.

FIG. 14 is a flowchart of the operation of the MFP 10 when printing is executed based on the page description language.

As shown in FIG. 14, when the display list generating means 18a acquires the page description language by receiving the same via the communication section 16, the display list generating means 18 a generates a display list from the acquired page description language (S101). For example, regarding a page 20 shown in FIG. 2, the display list generating section 18a generates, from the acquired page description language, a display list corresponding to a drawing instruction to the band 21 and a display list corresponding to the drawing instruction to the band 22.

Next, the render thread 18b generates raster image data by rendering for lines one by one based on the display list generated in step S101 (S102).

Then, a printing section 18d causes the printer 14 to execute printing based on the raster image data generated in step S102 (S103), and the operation shown in FIG. 14 terminates.

It is to be noted that the parallel process number determining means 18c determines of the number of the render threads 18b depending on the situation of the MFP 10 before the render threads 18b execute the process of step S102.

Figure 15:
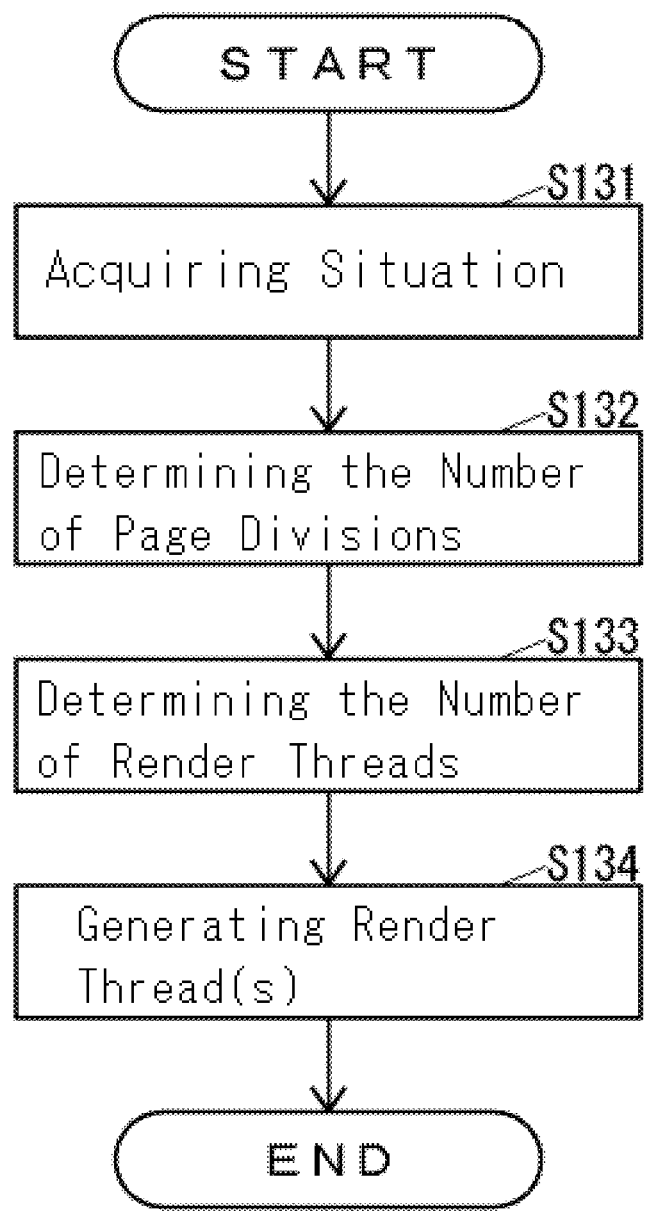
FIG. 15 is a flowchart of the operation of the MFP shown in FIG. 1 when determining of the number of render threads.

FIG. 15 is a flowchart illustrating how the MFP 10 operates for determining the number of the render threads 18b.

As shown in FIG. 15, the parallel process number determining means 18c acquires the situation of the MFP 10 (S131), where the situation of the MFP 10 means drawing process related functions i.e., the situation of system resources to the printer functions including, for example, CPU resources and memory (RAM) resources. The MFP 10 has plural functions, other than the printer function, which include, for example, a scanner function, a copying function, and a facsimile function, and therefore if executing the functions other than the printer function increase, the system resource allocation to the printer function reduces, and vice versa. In brief, the situation of system resource allocation to the printer function changes dynamically.

The parallel process number determining section 18c determines, after the process at step S131, of the number of divisions of the page 20 according to the situation acquired at step S131 (S132). It is to be noted that the relationship between the situation of the MFP 10 and the number of divisions of the page 20 is preset.

Next, the parallel process number determining means 18c determines of the number of the render threads 18b in accordance with the situation acquired in S131, for each of the bands generated by dividing the page 20 with the division number determined in S132 (S133). It is to be noted that the relationship between the situation of the MFP 10 and the number of render threads 18b per band is preset.

Then, the parallel process number determining means 18c generates the render threads 18b, the number of which has been determined in S133, for each of the bands generated by dividing the page 20 with the division number determined in S132 (S134), and the process operation shown in FIG. 15 terminates.

As such, the render threads 18b generated in S134 generates raster image data by rendering for scan lines one by one based on the display list generated in S101 (S102). At this stage, each of the render threads 18b executes its rendering based on the band targeted by the concerned render thread 18b itself and the start line offset, and skip line of the concerned render thread 18b itself.

As described above, the MFP 10 causes the render thread A and the render thread B, whose renderings are for the band 21, to execute their renderings in parallel. For this reason, it is possible to execute a plurality of drawing processes in parallel without having to use different display lists for each of the drawing processes. Consequently, for example, the MFP 10 can share the display list generating means 18a with an MFP such as one with a singular CPU core which is impossible to execute drawing processes in parallel, which makes it possible to facilitate manufacturing the MFP 10. In the above, the render thread A and the render thread B are described, but the same applies to the render thread C and the render thread D.

The MFP 10, which causes the render thread A and the render thread B to execute their renderings in parallel by interleaving process for every scan line, makes it possible to suppress the difference between the rendering process amount by the render thread A and the rendering process amount by the render thread B by performing the parallel rendering by interleaving for each scan line by the render thread A and the render thread B. For this reason, it is possible to average the process time for the render thread A and the process time for the render thread B. In this context, it is possible to improve the throughput of the MFP 10. It is to be noted that the process time difference between the renderings for one object by the render thread A and the render thread B varies depending on the shape of this object, but usually only a difference of at most one scan line occurs (see Mathematical Equation 1 and Mathematical Equation 2). Furthermore, in one band, usually, a plurality of objects arranged at various positions. Therefore, the difference in process time between the rendering by the render thread A and the rendering by the render thread B for a plurality of objects included in one band is averaged and becomes so small as to be in fact negligible. In the above description, the render thread A and the render thread B are described, but the same applies to the render thread C and the render thread D.

The MFP 10 causes the render thread A and the render thread B to execute their renderings for plural objects in a sequential manner depending on not the number of counted scan lines based on the each of the objects included in the band 21 but on the number of scan lines counted with reference to the band 21. For this reason, it is not necessary for these render threads to execute their renderings for each of the objects in a synchronization manner, thereby improving the throughput. It is to be noted that the render thread A and the render thread B may execute their renderings, depending on the scan lines counted with reference to each of the objects, for plural objects in a sequential manner. In the above, the description has been made as to the render thread A and the render thread B are described, however the same applies to the render thread C and the render thread D.

The MFP 10 determines of the number of the render threads 18b that the MFP 10 has at the same time, which makes it possible to adjust dynamically the number of the render threads 18b to increase, as long as the process efficiency of the entire system i.e., the MFP 10 as a whole is not lowered, depending on the situation of the MFP 10.

For example, in a case where the MFP 10 has a configuration in which the copy function has a higher priority than the printer function, if the copy function is executed, the system resources allocated to the printer function decreases. Thus, the parallel process number determining means 18c can reduce the number of divisions of the page 20 and the number of render threads 18b per band depending on the system resources allocated to the printer function. In such a way, the MFP 10 can dynamically change the number of the render threads 18b that the MFP 10 simultaneously has depending on the operation state of the system, i.e., the operation state of the MFP 10.

If no RAM is provided in an addition manner, the system resources to be allocated to the printer function are reduced as compared with the case where a RAM is added. Therefore, the MFP 10 can dynamically change the number of the render threads 18b that the MFP 10 has at the same time according to the RAM expansion situation.

The MFP 10 is allowable to cause three or more render threads to execute their renderings in parallel by interleaving process every scan line for one or more specific portions in the page 20. For example, regarding three render threads that execute their renderings in parallel by interleaving process every scan line for the specific portion in the page 20, the start line off set and skip line associated with the first render thread are 0 and 2, respectively, the start line off set and skip line associated with the second render thread are 1 and 2, respectively, and the start line off set and skip line associated with the third render thread are 2 and 2, respectively. In brief, in a cease of causing n (where n: an integer of 2 or more) pieces of threads to execute their renderings in parallel by interleaving process for every scan line for the specific portion in the page 20, the start line offsets associated with n pieces of render threads are 0, 1, 2, (omission), and n−1, respectively, and the skip line associated with each of the render threads is n−1.

The MFP 10 is also allowable to cause a singular render thread to execute its rendering for every scan line of one or more specific portions in the page 20. The start line offset and skip line associated with singular thread that executes its rendering for every scan line of one or more specific portions in the page 20 are 0 and 0, respectively.

The MFP 10 has the render thread A and the render thread B that execute their renderings for the band 21 in the page 20, and the render thread C and the render thread D that execute their renderings for the band 22 in the page 20 in a simultaneous manner, which makes it possible to execute the renderings for the band 21 and 22, respectively, in parallel, thereby improving the throughout.

If the page 20 is divided into portions for the band 21 and the band 22, the MFP 10 may simply divide the page 20 into halves on region basis. In other words, for dividing the page 20 into plural portions, a simply even division is available for the MFP 10 to divide the page 20 into plural bands. In this case, in S133 shown in FIG. 15, with reference to the number of threads that has been determined depending on each of the situations acquired in S312, the parallel process number determining means 18c sets the number of render threads 18b for each of the band 21 and the band 22 by predicting that the rendering process times for each of the bands are equalized as much as possible. This configuration, even when the page 20 is equally divided into a plurality of bands, enables the MFP 10 to complete the renderings simultaneously for the plural bands. It is to be noted that the relationship between the situation of the MFP 10 and the number of the render threads 18b for the entire page 20 is preset.

In addition, the MFP 10 may divide the page 20 into the band 21 and the band 22 by predicting to thereby equalize the rendering process times for each band. More specifically, the MFP 10 may divide the page 20 into the band 21 and the band 22 to equalize the rendering process times for each band by predicting the rendering process times for each band based on various information including, for example, differences in characteristics such as characters, images, and vector graphics which are included in each band, and what type of ROP is performed.

The MFP 10 may include simultaneously a plurality of render threads for rendering each of bands which is obtained by dividing the page 20 into three or more bands. For example, the MFP 10 may divide the page 20 into four bands and may be simultaneously provided with four render threads that execute their renderings for different bands among these four bands.

In addition, the MFP 10 may be provided with a render thread that executes its rendering for the entire region of the page 20 without dividing the page 20 into plural bands. For example, the MFP 10 may cause four render threads to execute their renderings in parallel for each scan line in the entire region of the page 20.

It is to be noted that there are many cases in which executing the plural render threads 18b by mutually different CPU cores is preferable from the view point of process efficiency and therefore the executing CPU cores can be fixedly allocated to the render threads, respectively. However, in view of the fact that the CPU executes other than the render threads, there are some cases in which it is preferable that the render threads are not associated with their fixedly allocated CPU cores. Therefore, the MFP 10 may leave the OS that which CPU core will execute which render thread. For example, if the OS is Linux (Registered Trademark), the MFP 10 may leave the Linux scheduler which kind of render thread is executed by which CPU core. When leaving which OS cores execute which render threads, it may happen that one CPU core executes multiple render threads.

Although the image forming device of the present disclosure is in the form of the MFP in the present embodiment, the image forming device of the present disclosure may be in the form of image forming devices excluding the MFP which is, for example, a printer exclusive machine.

The image forming program of the present disclosure is executed by the MFP as a computer in the present embodiment, however it may be executed by a computer other than the image forming device such as a PC.

An image forming device according to the present disclosure can include plural drawing process sections that execute their renderings in a one-by-one manner based on a display list. The plural drawing process sections, each of which renders for a specific region that includes plural lines within a page, render for different lines every specific number of lines, the specific number being determined by subtracting 1 from the number of the multiple drawing process sections that execute their renderings for the specific regions.

According to this configuration, the image forming device of the present disclosure causes the plural render threads to execute their renders in parallel, based on the same display list, for the specific portion including plural lines of the page, which makes it possible to execute plural drawing processes in parallel without having to use different display lists for the respective drawing processes.

The image forming device of the present disclosure is one that can include plural drawing processes sections that execute their renderings in a one-by-one manner based on a display list and include a parallel process number determination section that determines of the number of the plural drawing processes sections to be provided simultaneously in the image forming device depending on a situation of the image forming device. The image forming device, if the parallel process number determination section determines of the number of the plural drawing processes to be provided in the image forming device each of which renders a specific region that includes plural lines within a page, renders for different lines every specific number of lines, the specific number being determined by subtracting 1 from all the number of the multiple drawing process sections that execute their renderings for the specific regions.

According to this configuration, the image forming device of the present disclosure, if the parallel process number determination section determines of the number of the plural drawing processes to be provided in the image forming device each of which renders for a specific region that includes plural lines within a page, causes the plural drawing processes to execute their renderings in parallel. For this reason, it is possible to execute without having to use different display lists for the respective drawing processes.

According to this configuration, the image forming device of the present disclosure, if the parallel process number determination section determines to provide plural drawing processes in the image forming device each of which renders a specific region that includes plural lines within a page and if plural objects are included in the specific region allows the plural drawing processes, each of which executes its rendering for a specific region, to render the plural objects in a sequential manner based on lines counted with reference to the specific region.

According to this configuration, the image forming device of the present disclosure, if the parallel process number determination section determines to provide plural drawing process sections in the image forming device each of which renders a specific region within a page, causes these drawing process sections to execute their renderings for plural objects based on not lines counted with reference to the objects, but lines counted with reference to the specific region. For this reason, it is not necessary for these drawing process sections to execute their renderings in synchronization with each other for each of the objects, thereby improving the throughput.

The image forming device of the present disclosure can allow the parallel process number determining section to determine of providing plural drawing process sections that executes their rendering for different regions among plural regions obtained by dividing a page.

According to this configuration, the image forming device of the present disclosure can render for plural regions in parallel according to a situation of the image forming device, which makes it possible to improve the throughput.

The image forming device of the present disclosure can allow the parallel process number determining section to determine of the number of the plural drawing process sections which is to be provided simultaneously in the image forming device and which execute their rendering for different regions of the same area by predicting to thereby equalize the rendering process times for the plural regions.

According to this configuration, even in a case of dividing the page equally into plural regions, it is possible for the image forming device of the present disclosure to terminate the renderings for the plural regions at the same time.

The image forming device of the present disclosure may allow, if plural objects are included in a specific region, the drawing process section that executes its rendering for a specific region to render the plural objects one by one in a sequential manner based on lines counted with reference to the specific region.

According to this configuration, the image forming device of the present disclosure causes the drawing process sections to execute their renderings for plural objects based on not lines counted with reference to the objects, but lines counted with reference to a specific region. For this reason, it is not necessary for the drawing process sections to execute their renderings in synchronization with each other for each of the objects, thereby improving the throughput.

The image forming device of the present disclosure may include simultaneously plural drawing process sections that execute their renderings for different regions among plural regions obtained by dividing a page.

According to this configuration, the image forming device of the present disclosure can render the plural regions in parallel, which makes it possible to improve the throughput.

The recording medium of the present disclosure is a non-transitory computer-readable recording medium that stores an image forming program executable by a computer. The image forming program causes the computer, based on a display list, to realize simultaneously plural drawing process sections each of which executes its rendering for lines one by one. The plural drawing process sections, each of which execute its rendering for a specific region that includes plural lines within a page, renders for different lines every specific number of lines, the specific number being determined by subtracting 1 from all the number of the plural drawing process sections that render their renderings for the specific regions.

According to this configuration, the computer, which executes the image forming program of the present invention, causes the plural drawing process sections each of which executes its rendering for a specific region within a page which includes plural lines in parallel based on a common display list. For this reason, it is possible to execute the plural drawing processes in parallel without having to use different display lists for the respective drawing processes.

The image forming program of the present disclosure causes the computer to realize a parallel process number determination section that determines of the number of the plural drawing process sections to be provided depending on a situation of the computer. If the parallel process number determination section determines simultaneously of the plural drawing process section to be provided each of which renders for a specific region that includes plural lines within a page, which features in rendering for different lines every specific number of lines, the specific number being determined by subtracting 1 from all the number of all the plural drawing process sections that render their renderings for the specific regions.

According to this configuration, the computer that executes the image forming program causes, if the parallel process number determination section determines simultaneously of the plural drawing process section to be provided each of which renders for a specific region that includes plural lines within a page, to these drawing process sections execute their renderings based on a common display list. For this reason, it is possible to execute plural renderings in parallel without having to different display lists for the respective drawing processes.

What is claimed is:

1. An image forming device comprising:
   a processor that executes an image forming program; and
   a memory that stores the image forming program,
   the processor being capable of, pursuant to instructions of the image forming program,
   including plural drawing process sections that render for lines one by one based on a display list, wherein each of the plural drawing process sections renders for a specific region,
   rendering, when a plurality of objects are included in the specific region, depending on a number of counted lines based on each of the plurality of objects, wherein said rendering comprises rendering each of the plurality of objects in turn for different lines every specific number of lines, the specific number being determined by subtracting 1 from all the number of the multiple drawing process sections that execute their renderings for the specific region, and
   synchronizing a start of rendering of each of the plurality of objects among the plural drawing process sections.

2. The image forming device according to claim 1, wherein
   the processor acts, pursuant to instructions of the image forming program, as a parallel process number determination section that determines of the number of the drawing process sections to be provided simultaneously depending on a situation of the image forming device, and
   if the parallel process number determination section determines of the number of the drawing process sections to be provided simultaneously which execute their renderings for a specific region within a page in which plural lines are included, the plural drawing process sections, each of which renders for a specific region within a page, render each of the plurality of objects in turn.

3. The image forming device according to claim 2, wherein the parallel process number determining section determines to provide the plural drawing process sections that execute their renderings for different regions among plural regions obtained by dividing a page.

4. The image forming device according to claim 3, wherein the plural regions have the same area, and
   the parallel process number determination section determines of the number of the plural drawing process sections to be provided simultaneously which execute their renderings for different regions by predicting an equalization of rendering process times for the plural regions.

5. The image forming device according to claim 1, wherein pursuant to the instructions of the image forming program, the processor includes plural drawing process sections simultaneously that execute their renderings for different regions among plural regions obtained by dividing a page.

6. A recording medium in the form of a non-transitory computer-readable recording medium that stores an image forming program executable by a computer,
   the image forming program
   causing the computer, based on a display list, to realize simultaneously plural drawing process sections each of which executes its rendering for lines one by one, and
   causing each of the plural drawing process sections, each of which renders for a specific region,
   when a plurality of objects are included in the specific region, depending on a number of counted lines based on each of the plurality of objects,
   to render each of the plurality of objects in turn for different lines every specific number of lines, the specific number being determined by subtracting 1 from all the number of the plural drawing process sections that render their renderings for the specific region, and
   synchronizing a start of rendering of each of the plurality of objects among the plural drawing process sections.

7. The recording medium according to claim 6, wherein the image forming program causes the computer to realize a parallel process number determination section that determines of the number of the plural drawing process sections to be provided depending on a situation of the computer, and if the parallel process number determination section determines simultaneously of the plural drawing process sections to be provided each of which renders for a specific region that includes plural lines within a page, each of the drawing process sections executes its rendering of each of the plurality of objects in turn.

* * * * *